US011495789B2

(12) United States Patent
Naito et al.

(10) Patent No.: US 11,495,789 B2
(45) Date of Patent: Nov. 8, 2022

(54) COMPOSITE ACTIVE MATERIAL

(71) Applicant: KABUSHIKI KAISHA TOSHIBA, Minato-ku (JP)

(72) Inventors: Katsuyuki Naito, Tokyo (JP); Yasuhiro Harada, Isehara (JP); Norihiro Yoshinaga, Kawasaki (JP); Yoshihiro Akasaka, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 764 days.

(21) Appl. No.: 14/660,052

(22) Filed: Mar. 17, 2015

(65) Prior Publication Data
US 2015/0333322 A1 Nov. 19, 2015

(30) Foreign Application Priority Data

May 13, 2014 (JP) .............................. JP2014-100014

(51) Int. Cl.
*H01M 4/13* (2010.01)
*H01M 4/58* (2010.01)
(Continued)

(52) U.S. Cl.
CPC ........... *H01M 4/364* (2013.01); *H01M 4/131* (2013.01); *H01M 4/133* (2013.01); *H01M 4/1391* (2013.01); *H01M 4/1393* (2013.01); *H01M 4/48* (2013.01); *H01M 4/587* (2013.01); *H01M 4/625* (2013.01); *H01M 10/0525* (2013.01);
(Continued)

(58) Field of Classification Search
None
See application file for complete search history.

(56) References Cited

U.S. PATENT DOCUMENTS 6,744,237 B2 * 6/2004 Kopf ..................... H01M 10/44
320/104
2002/0009637 A1 * 1/2002 Murakami ............. B82Y 30/00
429/213
(Continued)

FOREIGN PATENT DOCUMENTS

CN 102544466 A 7/2012
CN 102757031 10/2012
(Continued)

OTHER PUBLICATIONS

Japanese Notification of Reasons for Refusal dated Mar. 28, 2017 in connection with Japanese Patent Application No. 2014-100014.
(Continued)

*Primary Examiner* — Cynthia H Kelly
*Assistant Examiner* — Julian Anthony
(74) *Attorney, Agent, or Firm* — Oblon, McClelland, Maier & Neustadt, L.L.P.

(57) ABSTRACT

According to one embodiment, there is provided a composite. The composite includes active material particles of a titanium composite oxide or oxide of titanium, and a graphene structure including a carbon material. The carbon material has a graphene framework defining a graphene surface. The graphene structure is located in between the active material particles. The graphene structure has at least one side surface in contact with the active material particle. The side surface includes the carbon material whose graphene surface is slanted relative to the side surface.

12 Claims, 11 Drawing Sheets

(51) Int. Cl.
  *H01M 4/62* (2006.01)
  *H01M 4/36* (2006.01)
  *H01M 4/131* (2010.01)
  *H01M 4/133* (2010.01)
  *H01M 4/587* (2010.01)
  *H01M 10/0525* (2010.01)
  *H01M 4/1391* (2010.01)
  *H01M 4/1393* (2010.01)
  *H01M 4/48* (2010.01)
  *H01M 4/02* (2006.01)
  *H01M 4/485* (2010.01)

(52) U.S. Cl.
  CPC ...... *H01M 4/485* (2013.01); *H01M 2004/027* (2013.01); *Y02T 10/70* (2013.01)

(56) References Cited

U.S. PATENT DOCUMENTS

| | | | |
|---|---|---|---|
| 2002/0182505 | A1 | 12/2002 | Yanagisawa et al. |
| 2003/0044685 | A1* | 3/2003 | Yanagisawa .......... H01M 4/133 429/231.8 |
| 2004/0179989 | A1 | 9/2004 | Height et al. |
| 2004/0202934 | A1* | 10/2004 | Zaghib .................. B82Y 30/00 429/231.1 |
| 2009/0075077 | A1 | 3/2009 | Yoon |
| 2010/0081057 | A1* | 4/2010 | Liu ........................ B82Y 30/00 429/231.5 |
| 2011/0123866 | A1 | 5/2011 | Pan et al. |
| 2011/0183180 | A1 | 7/2011 | Yu et al. |
| 2011/0262809 | A1 | 10/2011 | Kumagai et al. |
| 2012/0034463 | A1* | 2/2012 | Endo ...................... C01B 32/05 428/402 |
| 2012/0052401 | A1* | 3/2012 | Goodenough ......... C01G 33/00 429/341 |
| 2012/0064409 | A1 | 3/2012 | Zhamu et al. |
| 2012/0088158 | A1 | 4/2012 | Liu et al. |
| 2012/0104327 | A1 | 5/2012 | Kim et al. |
| 2012/0107692 | A1 | 5/2012 | Harada et al. |
| 2012/0135294 | A1 | 5/2012 | Harada et al. |
| 2012/0177995 | A1* | 7/2012 | Sun ........................ B82Y 30/00 429/231.8 |
| 2012/0261622 | A1 | 10/2012 | Honma |
| 2012/0305165 | A1 | 12/2012 | Liu et al. |
| 2012/0315482 | A1 | 12/2012 | Muramatsu et al. |
| 2012/0321953 | A1 | 12/2012 | Chen et al. |
| 2013/0081678 | A1 | 4/2013 | Naito et al. |
| 2013/0149612 | A1 | 6/2013 | Takemoto et al. |
| 2013/0224603 | A1 | 8/2013 | Chen et al. |
| 2013/0252499 | A1 | 9/2013 | Zhou et al. |
| 2013/0255763 | A1 | 10/2013 | Naito et al. |
| 2013/0260189 | A1* | 10/2013 | Schaefer ................ H01M 4/62 429/50 |
| 2013/0266858 | A1* | 10/2013 | Inoue ..................... H01M 4/133 429/211 |
| 2013/0271085 | A1 | 10/2013 | Chen et al. |
| 2013/0272950 | A1* | 10/2013 | Yun ........................ C01B 32/192 423/447.1 |
| 2013/0330611 | A1 | 12/2013 | Chen et al. |
| 2014/0023926 | A1* | 1/2014 | Li .......................... H01M 4/133 429/213 |
| 2014/0120380 | A1 | 5/2014 | Inagaki et al. |

FOREIGN PATENT DOCUMENTS

| | | |
|---|---|---|
| CN | 101937985 B | 3/2013 |
| CN | 103081187 A | 5/2013 |
| CN | 103181004 A | 6/2013 |
| GB | 2 492 167 A | 12/2012 |
| JP | 2001-288625 | 10/2001 |
| JP | 2003-51310 | 2/2003 |
| JP | 2004-244309 | 9/2004 |
| JP | 2007-227199 | 9/2007 |
| JP | 2008-91079 | 4/2008 |
| JP | 2009-12988 A | 1/2009 |
| JP | 2010-265176 A | 11/2010 |
| JP | 2012-6817 | 1/2012 |
| JP | 2012-6826 | 1/2012 |
| JP | 2012-48963 | 3/2012 |
| JP | 2012-69454 | 4/2012 |
| JP | 2012-99287 A | 5/2012 |
| JP | 2012-101958 | 5/2012 |
| JP | 2012-252824 A | 12/2012 |
| JP | 2013-504168 | 2/2013 |
| JP | 2013-73854 | 4/2013 |
| JP | 2013-80565 | 5/2013 |
| JP | 2013-126932 A | 6/2013 |
| JP | 2013-173660 | 9/2013 |
| JP | 2013-209261 | 10/2013 |
| JP | 2013-218838 A | 10/2013 |
| JP | 2014-24724 A | 2/2014 |
| JP | 2014-505650 A | 3/2014 |
| WO | WO 2010/052950 A1 | 5/2010 |
| WO | WO 2011/078112 A1 | 6/2011 |
| WO | WO 2011/102473 A1 | 8/2011 |
| WO | WO 2012/048194 A2 | 4/2012 |

OTHER PUBLICATIONS

Office Action dated Apr. 5, 2016 in Japanese Patent Application No. 2014-100014 (with English language translation).
Combined Office Action and Search Report dated Feb. 17, 2017 in Chinese Patent Application No. 201510112063.0 with English translation of categories of cited documents.
Ralph KLurt, et al. Influence of Nitrogen on the Growth Mechanism of Decorated C:N Nanotubes, CHEMPHYSCHEM, No. 6, 2001, pp. 388-392.
Extended Search Report dated Sep. 18, 2015 in European Patent Application No. 15159183.1.
Office Action dated Mar. 18, 2016 in Korean Patent Application No. 10-2015-0034860 (with English language translation).
Qian Zhang, et al., "$Li_4Ti_5O_{12}$/Reduced Graphene Oxide composite as a high rate capability material for lithium ion batteries", Solid State Ionics, vol. 236, 2013, pp. 30-36.
Changshin Jo, et al., "Block Copolymer Directed Ordered Mesostructured $TiNb_2O_7$ Multimetallic Oxide Constructed of Nanocrystals as High Power Li-Ion Battery Anodes", Chemistry of Materials, vol. 26, 2014, pp. 3508-3514.
Surajit Some, et al., "Highly Air-Stable Phosphorus-Doped n-Type Graphene Field-Effect Transistors", Advanced Materials, vol. 24, 2012, pp. 5481-5486.
Office Action dated Jan. 10, 2017 in Japanese Patent Application No. 2014-100014.
Shubin Yang, et al , "Bottom-up Approach toward Single-Crystalline $VO_2$-Graphene Ribbons as Cathodes for Ultrafast Lithium Storage", NANO Letters. , 13 (4), 2013, 7 pages.

* cited by examiner

COMPOSITE ACTIVE MATERIAL

CROSS-REFERENCE TO RELATED APPLICATION

This application is based upon and claims the benefit of priority from Japanese Patent Application No. 2014-100014, filed May 13, 2014; the entire contents of which are incorporated herein by reference.

FIELD

Embodiments described herein relate generally to a composite, a method of manufacturing a composite, an active material, and a nonaqueous electrolyte battery.

BACKGROUND

Recently, as a battery having a high energy density, a lithium-ion secondary battery has been developed. The lithium-ion secondary battery is anticipated as a power source for vehicles such as hybrid vehicles or electric cars. The lithium-ion secondary battery is also anticipated as an uninterruptible power supply for mobile phone base stations. Therefore, the lithium-ion secondary battery is desired to have performances other than high energy density, such as rapid charge and discharge performances and long-term reliability. A lithium-ion secondary battery capable of rapid charge and discharge not only remarkably shortens the charging time, but also makes it possible to improve performances related to the motive force of a hybrid vehicle and to efficiently recover the regenerative energy of the motive force.

In order to enable rapid charge and discharge, it is necessary for electrons and lithium ions to be able to migrate rapidly between the positive electrode and the negative electrode. When a battery using a carbon-based material in the negative electrode undergoes repeated rapid charge and/or discharge, dendrite precipitation of metal lithium occurs on the electrode. Dendrites cause internal short circuits, which can lead to heat generation and fires.

In light of this, a battery using a metal composite oxide as a negative electrode active material, in place of a carbonaceous material, has been developed. Particularly, in a battery using an oxide of titanium as the negative electrode active material, rapid charge and discharge can be performed stably. Such a battery also has a longer life than those using a carbonaceous material.

However, oxides of titanium have a higher potential relative to metal lithium than that of the carbonaceous material, that is, oxides of titanium are noble relative to metal lithium. Further, oxides of titanium have lower capacity per weight. Therefore, a battery using an oxide of titanium possesses a problem in that its energy density is low.

As to the capacity of the battery per unit weight, the theoretical capacity of a lithium-titanium composite oxide such as $Li_4Ti_5O_{12}$ is about 175 mAh/g. On the other hand, the theoretical capacity of a general graphite-based electrode material is 372 mAh/g. Therefore, the capacity density of an oxide of titanium is significantly lower than that of the carbon based negative electrode. This is due to a reduction in substantial capacity because there are only a small number of lithium-absorption sites in the crystal structure and lithium tends to be stabilized in the structure.

In view of such circumstances, a new electrode material including Ti and Nb has been examined. Such materials are expected to have high charge and discharge capacities. Particularly, a composite oxide represented by $TiNb_2O_7$ has a theoretical capacity exceeding 300 mAh/g. However, the conductivity of $TiNb_2O_7$ is not high. Therefore, carbon materials are added to $TiNb_2O_7$ to increase conductivity.

Various materials are studied as a carbon material used for increasing conductivity. For example, a combination of Ketjen black with a titanium-niobium composite oxide is known. In order to provide sufficient conductivity to the titanium-niobium composite oxide, however, it is required to use a large amount of the Ketjen black. Use of a large amount of the Ketjen black may cause problems of a reduced capacity and destabilization of the oxide.

Another strategy is a method in which a low molecular weight organic substance such as a dicarboxylic acid or sucrose is sintered onto the titanium-niobium composite oxide. The low molecular weight organic substance such as the dicarboxylic acid or sucrose, however, has low conductivity. For that reason, it may be necessary to use a large amount of the carbide to provide sufficient conductivity to the titanium-niobium composite oxide. In addition, the sucrose easily generates a reductive intermediate. For that reason, if a large amount of the sucrose is used, a part of the oxide is reduced, and thus a capacity is easily reduced.

In yet another strategy, there is disclosure of a technique to combine graphene with a titanium-niobium composite oxide. The graphene, however, tends to have a weak connection with the titanium-niobium composite oxide. For that reason, in a nonaqueous electrolyte battery including the combination of the graphene and the titanium-niobium composite oxide wherein no measure is taken for the connection between the graphene and the titanium-niobium composite oxide, detachment readily occurs, leading to a reduction in capacity, when cycles are repeated.

Carbon fibers are also known as another example of the material for increasing conductivity.

DETAILED DESCRIPTION

Figure 1:
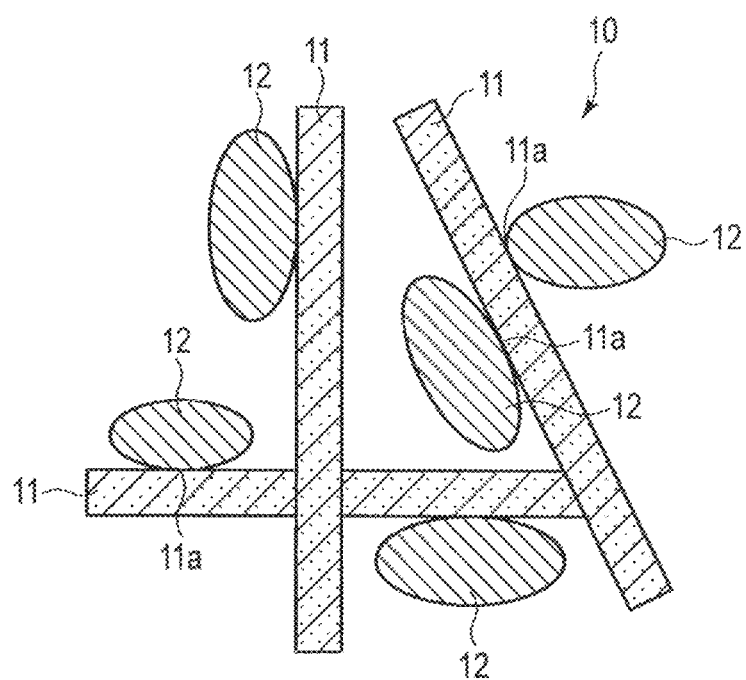
FIG. 1 is a schematic cross-sectional view showing one example of a composite according to a first embodiment.

According to one embodiment, there is provided a composite. The composite includes active material particles of a titanium composite oxide or oxide of titanium, and a graphene structure including a carbon material. The carbon material has a graphene framework defining a graphene surface. The graphene structure is located in between the active material particles. The graphene structure has at least one side surface in contact with the active material particle. The side surface includes the carbon material whose graphene surface is slanted relative to the side surface.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be appropriately changed taking the following explanations and known technologies into consideration.

First Embodiment

According to a first embodiment, there is provided a composite. The composite includes a plurality of active material particles of a titanium composite oxide or oxide of titanium, and a graphene structure including a plurality of carbon materials. The carbon materials each have a graphene framework defining a graphene surface. The graphene structure is located in between the active material particles. The graphene structure has at least one side surface in contact with the active material particle. The side surface includes the carbon material whose graphene surface is slanted relative to the side surface.

The composite according to the first embodiment includes a graphene structure, which includes a plurality of carbon materials having a graphene framework. Such a graphene structure can promote diffusion of a charge carrier substance such as a lithium ion. The graphene structure can also show conductivity that is higher than that of a low molecular weight organic substances such as Ketjen black, a dicarboxylic acid, or sucrose. For that reason, the graphene structure, located in between the active material particles, can form an excellent conductive network between the active material particles. In addition, since the composite according to the first embodiment includes the graphene structure that can exhibit high conductivity, a nonaqueous electrolyte battery using the composite is capable of being operated at a high current.

In the graphene structure included in the composite according to the first embodiment, the graphene surface of the carbon material constituting the side surface is slanted relative to the side surface. As a result, the graphene structure can include an active graphene edge on the side surface, which is an exterior surface. The graphene structure including the active graphene edge on the side surface can strongly bond to the active material particle in contact with the side surface. On the contrary, the graphene surface of a typical tubular carbon fiber is nearly parallel to the exterior surface, and the tubular carbon fiber is nearly symmetrical to the axis. Compared to such typical carbon fibers, the graphene structure included in the composite according to the first embodiment can include more graphene edges on the side surface.

The graphene surface, which is slanted relative to the side surface, can make a contact area between graphene surfaces larger. As a result, such a graphene surface can increase the stability of the graphene structure.

In the composite according to the first embodiment as described above, the graphene structure and the active material particles can be strongly bonded to each other, and the composite can show excellent stability. Thus, the composite can exhibit excellent repetition stability, and allow the nonaqueous electrolyte battery using this composite to be operated even at a high current. As a result, the composite according to the first embodiment allows a nonaqueous electrolyte battery, which can exhibit excellent capacity retention, to be realized.

Next, referring to drawings, an example of the composite according to the first embodiment will be explained in more detail.

Figure 2:
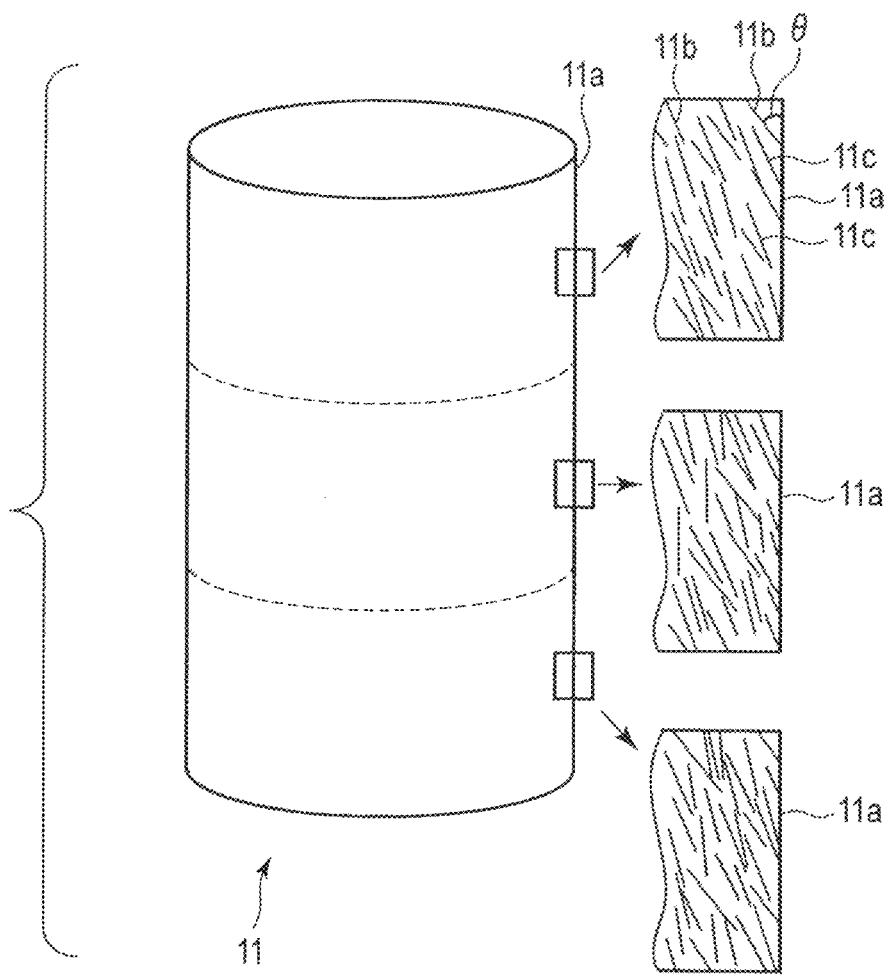
FIG. 2 is a schematic perspective view of the graphene structure shown in FIG. 1.
Figure 3:
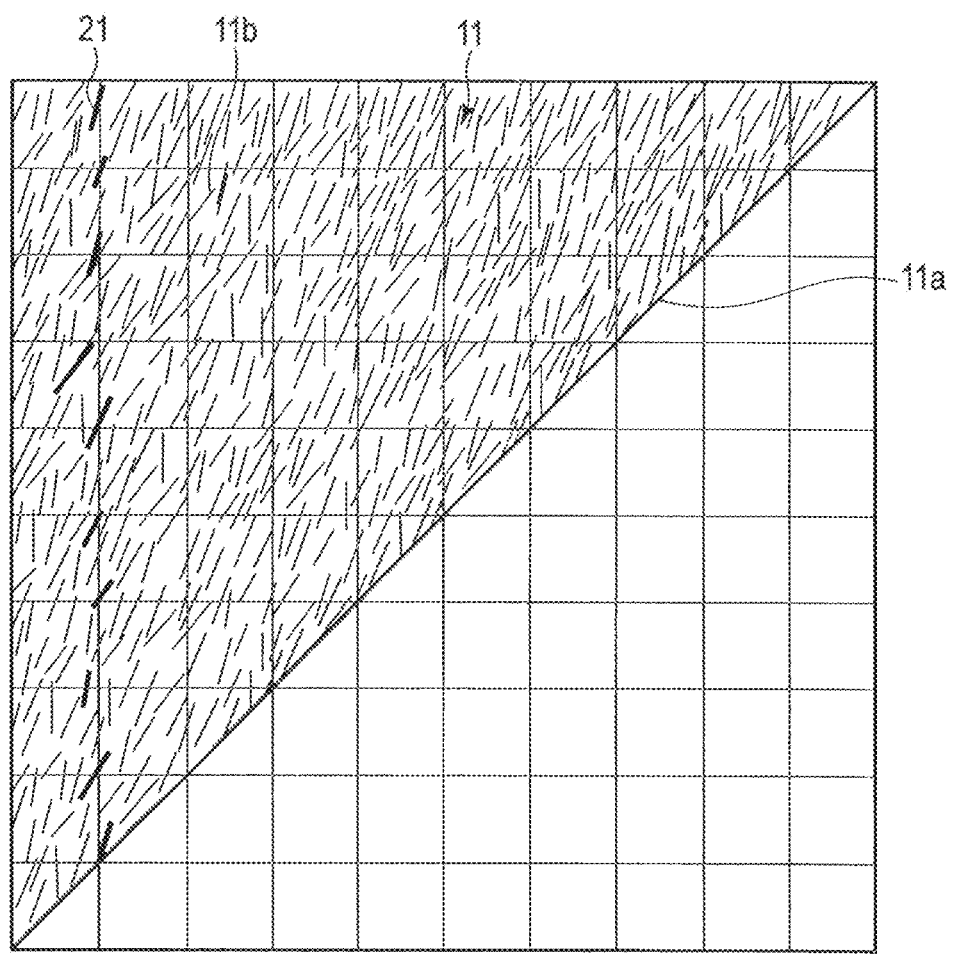
FIG. 3 is an enlarged schematic cross-sectional view of the graphene structure shown in FIG. 1.

FIG. 1 is a schematic cross-sectional view showing an example of the composite according to the first embodiment. FIG. 2 is a schematic perspective view showing the graphene structure in FIG. 1. FIG. 3 is an enlarged schematic cross-sectional view showing the graphene structure in FIG. 1.

A composite 10, shown in FIG. 1, includes a plurality of active material particles 12. The active material particle 12 is a particle of a titanium composite oxide or oxide of titanium.

The composite 10, shown in FIG. 1, further includes graphene structures 11, located in between the active material particles 12. The graphene structure 11 has a side surface 11a. The graphene structure 11 is in contact with the active material particle 12 at the side surface 11a.

The graphene structure 11 includes, as shown in FIG. 2 and FIG. 3, a plurality of carbon materials 11b. The carbon material 11b, shown in FIG. 2 and FIG. 3, has a graphene framework defining a graphene surface 11c expressed by a line segment. The carbon material 11b, shown in the upper right of FIG. 2 constitutes the side surface 11a of the graphene structure 11, and the graphene surface 11c is slanted relative to the side surface 11a at an angle θ. As shown in FIG. 2 and FIG. 3, a plurality of pairs of various angles of slanting of the graphene surface 11c relative to the side surface 11a, are included in the plurality of the carbon materials 11b. Further, as shown in FIG. 2 and FIG. 3, the plurality of the carbon materials 11b are densely stacked.

The side surface 11a of the graphene structure 11 includes a plurality of carbon materials, whose graphene surface 11c is slanted relative to the side surface 11a. As a result, the side surface 11a of the graphene structure 11 includes a graphene edge.

The active material particle 12 is mainly bonded to the graphene edge of the side surface 11a of the graphene structure 11.

Next, each element forming the composite according to the first embodiment will be explained in detail.

(1) Graphene Structure

The graphene structure can be, for example, in the form of a column, as approximately shown in FIG. 2. The form of the graphene structure, however, is not limited to the form shown in FIG. 2.

Referring to FIGS. 4 to 7, specific examples of the graphene structure, which can be included in the composite according to the first embodiment, will be explained below.

Figure 4:
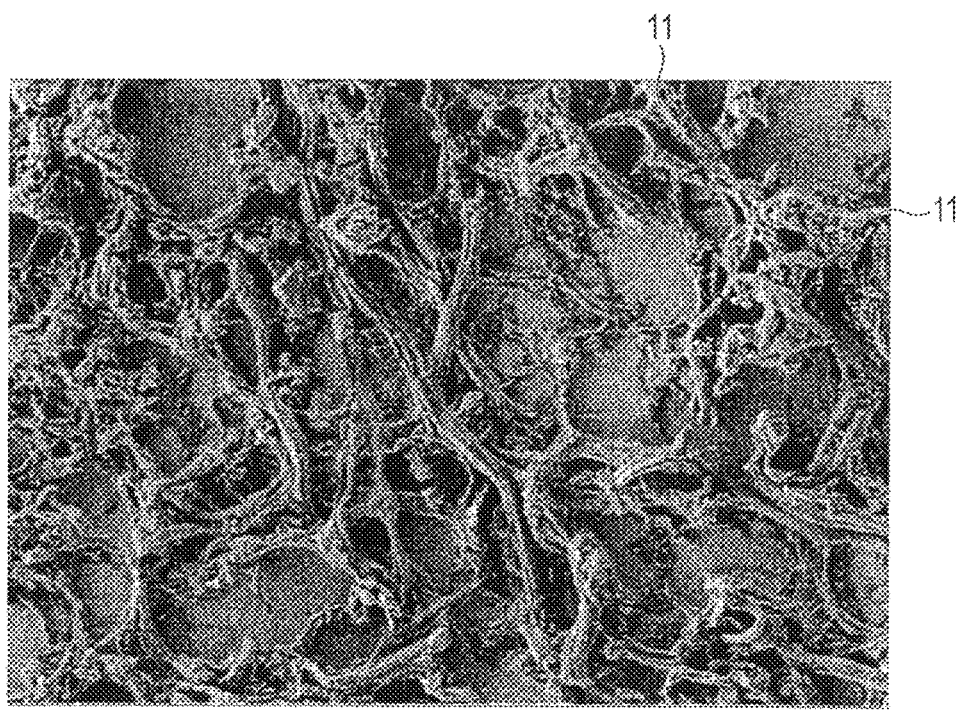
FIG. 4 is a scanning electron microscope (SEM) photograph of an example of oxidized graphene structures, which can be included in a composite according to a first embodiment.
Figure 5:
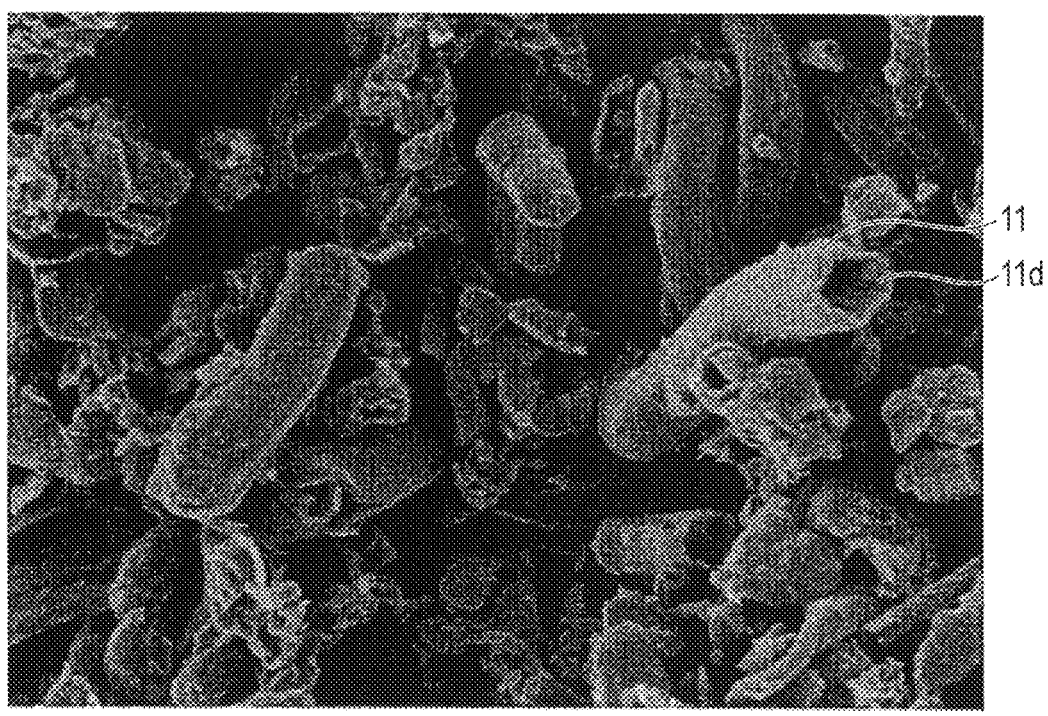
FIG. 5 is a scanning electron microscope (SEM) photograph of an example of graphene structures, which can be included in a composite according to a first embodiment.
Figure 6:
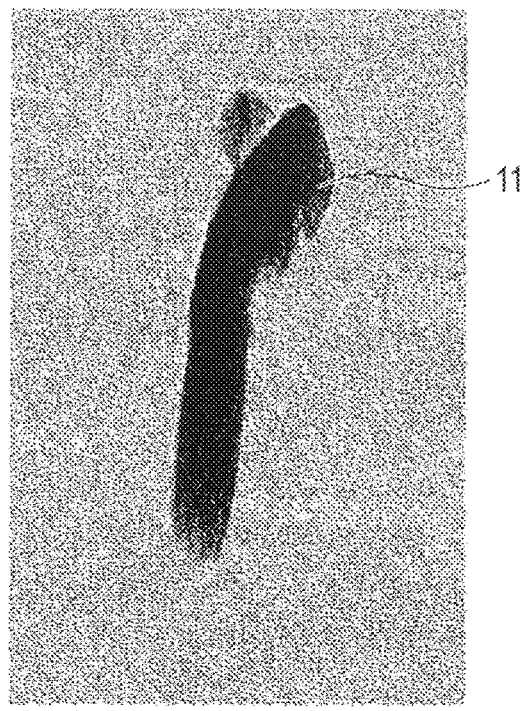
FIG. 6 is a transmission electron microscope (TEM) photograph of an example of graphene structures, which can be included in a composite according to a first embodiment.
Figure 7:
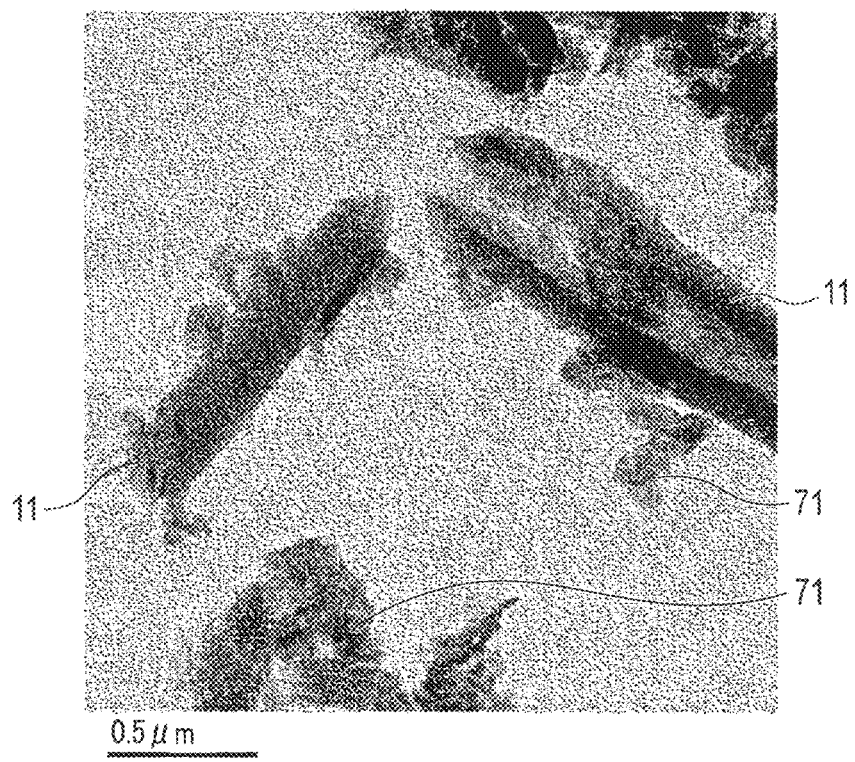
FIG. 7 is a transmission electron microscope (TEM) high magnification photograph of an example of graphene structures, which can be included in a composite according to a first embodiment.

FIG. 4 is a scanning electron microscope (SEM) photograph of an example of oxidized graphene structures which can be included in the composite according to the first embodiment. FIG. 5 is a scanning electron microscope (SEM) photograph of an example of graphene structures which can be included in the composite according to the first embodiment. FIG. 6 is a transmission electron microscope (Transmission Electron Microscope: TEM) photograph of an example of graphene structures which can be included in the composite according to the first embodiment. FIG. 7 is a transmission electron microscope (TEM) high magnification photograph of an example of graphene structures which can be included in the composite according to the first embodiment.

For example, the graphene structure can have a configuration in which fibers are entangled with each other, as shown as an example in FIG. 4. The graphene structure may also have a form as shown in FIG. 5 as an example. Specifically, as shown in FIG. 5, the graphene structure 11 may have a form in which an end portion 11d is opened. Such a graphene structure 11 can have a cavity at the end portion 11d. The graphene structure 11 having the cavity can have more active sites and can exhibit excellent diffusibility of substances, and is therefore preferable. The cavities can be observed, as shown in FIG. 5, with a scanning electron microscope.

The graphene structure is not necessarily in a form without curves as shown in FIG. 2. For example, the graphene structure shown as an example in FIG. 4 is winding, and the graphene structure shown in FIG. 6 has a bent form. Further, the graphene structure may include parts whose diameters are different from each other, as shown in a left viewing field of FIG. 7. The graphene structure, therefore, may be in the form of a column, cone, or frustum.

The graphene structure preferably has a diameter within a range of 30 nm to 500 nm. The graphene structure described above has sufficient active sites, and at the same time, can prevent the diffusion of substances, which react using the carbon material including the graphene framework as a catalyst, from being inhibited. More preferably, the graphene structure has a diameter of 100 nm to 300 nm. A length of the graphene structure in a longitudinal direction is preferably 1 μm to 10 μm.

The side surface of the graphene structure preferably includes a carbon material whose graphene surface is slanted at an angle of 5° to 80° relative to the side surface. Such a graphene structure has sufficient contact area between graphene surfaces of the carbon material and exhibit more excellent stability. The graphene structure also has a sufficient graphene edge on the side surface, whereby stronger bonding to the active material particles can be provided. The angle of slanting is more preferably 10° to 60°.

It is preferable that the graphene surfaces of 5% to 95% of the carbon material constituting the side surface of the graphene structure are slanted relative to the side surface of the graphene structure. Such a graphene structure is more excellent in stability. The graphene structure can also have sufficient graphene edges on the side surface, and can provide stronger bonding to the active material particles. It is more preferable that the graphene surfaces of 40% to 90% of the carbon material constituting the side surface of the graphene structure are slanted relative to the side surface of the graphene structure.

In the graphene structure, it is also preferable that the compounds having the graphene framework are densely overlapped with one another. The densely overlapped state refers to a state in which 50% or more of the graphene surface is overlapped with another graphene surface, in a visual field where the graphene surfaces can be observed in a TEM image of the graphene structure enlarged to a 4,000,000 times magnification. When the graphene is in the densely overlapped state, there is an advantage in that the structure is stabilized.

In addition to a 6-membered ring, the graphene framework may be constituted of a 5-membered ring or a 7-membered ring, in part. The graphene structure may also include a heteroatom such as nitrogen, oxygen, or phosphorus, in part. When the graphene framework includes nitrogen or oxygen, the bonding between the graphene structure and the active material particle becomes stronger. By including phosphorus, resistance of the graphene structure to oxygen becomes stronger and incombustibility of the graphene structure increases.

An amount of substitution of carbon atoms by nitrogen atoms in the graphene framework is preferably 0.1 atom % to 30 atom %, in terms of an amount of the nitrogen atoms relative to the carbon atoms. When the amount of substitution of the nitrogen atoms relative to the carbon atoms is within the range described above, the effect of enhancing the bonding between the graphene structure and the active material particles can be sufficiently expected, and an increased electric resistance caused by disturbance of the graphene structure can be prevented. The amount of substitution of the nitrogen atoms relative to the carbon atoms is more preferably 0.4 atom % to 20 atom. %.

An amount of introduced oxygen atoms is preferably 0.1 atom % to 20 atom %, in terms of the oxygen atoms relative to carbon atoms. When the amount of the introduced oxygen atoms relative to the carbon atom is within the range described above, the effect of enhancing the bonding between the graphene structure and the active material particles can be sufficiently expected, and an increased electric resistance caused by disturbance of the graphene structure can be prevented. More preferably, the amount of the introduced oxygen atoms to the carbon atoms is 0.2 atom % to 20 atom %.

The graphene structure may include phosphorus as a phosphorus compound. The phosphorus compound, which may be included in the graphene structure, may include, for example, at least one of mono-phosphoric acid, oligophosphoric acid, and polyphosphoric acid. The phosphorus compound may be included on the surface and interior of the graphene structure. Inclusion of the phosphorous compound in the graphene structure is preferable in that, the phosphorus compound traps radicals, whereby the deterioration of the graphene structure can be prevented. The presence of the phosphorus compound in the graphene structure can be observed using, for example X-ray photoelectron spectroscopy (XPS). In spectra obtained in the XPS, a peak of electron emission energy of the 2p orbital from oligophosphoric acid appears at around 132.0 to 133.0 eV. A peak of electron emission energy of the 2p orbital from pyrophosphate, which is an oligophosphoric acid obtained by condensation of two molecules of orthophosphoric acids, appears at around 132.6 to 133.3 eV. A peak of electron emission energy of the 2p orbital from a polyphosphate appears at around 134.0 to 134.5 eV.

(2) Active Material Particle

The active material particles are a plurality of active material particles of a titanium composite oxide or oxide of titanium.

The titanium composite oxide may include, for example, a titanium-niobium composite oxide. The titanium-niobium composite oxide can be expressed, for example, by a general formula: $Li_xTi_{1-y}M1_yNb_{2-z}M2_zO_7$ wherein indexes x, y and z are within ranges of $0 \leq x \leq 5$, $0 \leq y < 1$, and $0 \leq z \leq 2$, respectively. The index x may vary depending on the charge or discharge state. M1 is at least one element selected from the group consisting of Zr, Si, and Sn. M2 is at least one element selected from the group consisting of V, Nb, Ta, and Bi.

The titanium-niobium composite oxide, represented by a general formula: $Li_xTi_{1-y}M1_yNb_{2-z}M2_zO_7$, can show excellent insertion stability of Li ions, and allows a nonaqueous electrolyte battery showing a high capacity and a high rate performance to be realized.

On the other hand, the conductivity of the titanium-niobium composite oxide is not high, as explained above. According to the first embodiment, however, even if the titanium-niobium composite oxide is used as the active material particle, excellent conductivity can be exhibited and the excellent repetition stability can be exhibited.

During the preparation of the titanium-niobium composite oxide, oxygen deficiencies may be generated in starting materials or intermediates. In addition, inevitable impurities included in the starting materials and impurities introduced during the preparation may exist in the prepared composite oxide. For those reasons, the titanium-niobium composite oxide may sometimes include, for example, oxides resulting from the above inevitable factors, having a composition which is beyond the stoichiometric ratio represented by the general formula: $Li_xTi_{1-y}M1_yNb_{2-z}M2_zO_7$. For example, an oxide having a composition represented by a general formula: $Li_xTi_{1-y}M1_yNb_{2-z}M2_zO_{7-\delta}$ wherein $\delta \leq 0.3$ may be prepared resulting from oxygen deficiency generated during the preparation of the oxide.

However, even such oxides having a composition beyond the stoichiometric ratio resulting from the inevitable factors described above, can show excellent insertion stability of Li ions. For that reason, even active material particles including the oxides having a composition beyond the stoichiometric ratio resulting from inevitable factors, the oxide having, for example a composition represented by the general formula: $Li_xTi_{1-y}M1_yNb_{2-z}M2_zO_{7\pm\delta}$ wherein $\delta \leq 0.3$, can exhibit the same effects as those of the oxide having the composition represented by the general formula: $Li_xTi_{1-y}M1_yNb_{2-z}M2_zO_7$.

The particles of the titanium-niobium composite oxide, that is, the primary particles, preferably have an average particle size of 10 nm to 100 μm. Titanium-niobium composite oxide particles whose primary particles have an average particle size of 10 nm or more can be handled easily, in terms of industrial production. The titanium-niobium composite oxide particles whose primary particles have an average particle size of 100 μm or less can more smoothly diffuse lithium ions in the titanium-niobium composite oxide solid.

It is more preferable that the secondary particles of the titanium-niobium composite oxide particles have an average particle size of 0.03 μm to 30 μm. The titanium-niobium composite oxide particles whose secondary particles have an average particle size of 0.03 μm or more can be handled easily, in terms of industrial production. Further, with the titanium-niobium composite oxide particles whose secondary particles have an average particle size of 30 μm or less, the mass and the thickness of a coating for manufacturing an electrode can easily be made uniform, and a more improved surface smoothness can be achieved.

The particles of the titanium-niobium composite oxide preferably have a specific surface area of 0.5 $m^2/g$ to 50 $m^2/g$ or less. The titanium-niobium composite oxide particles having a specific surface area of 0.5 $m^2/g$ or more can provide sufficient absorbing and desorbing sites for lithium ions. The titanium-niobium composite oxide particles having a specific surface area of 50 $m^2/g$ or less can be handled easily, in terms of industrial production. The specific surface area of the titanium-niobium composite oxide particles is more preferably 3 $m^2/g$ 30 $m^2/g$.

Another example of a titanium composite oxide may include lithium titanate. The lithium titanate may include, for example, lithium titanate having a spinel structure, which can be represented by a general formula: $Li_{4+x}Ti_5O_{12}$ (x varies within a range of $0 \leq x \leq 3$ depending on the state of charge), and lithium titanate having a ramsdellite structure, represented by a general formula: $Li_{2+y}Ti_3O_7$.

The oxide of titanium may include, for example, titanium oxide $TiO_2(B)$ having a monoclinic β-type structure.

The active material particle may include a carbon layer other than the graphene structure on its surface. The carbon layer may cover a part of the surface of the active material particle or the entire surface of the active material particle.

The active material particles further including the carbon layer on its surface can exhibit higher bonding strength to the graphene structure. This is because condensed aromatic rings included in the carbon layer can further exhibit a π-π interaction with the graphene edges, which exist on the side surfaces of the graphene structure, and further with the graphene surfaces of the carbon material. The carbon layer included in the active material particle can strongly bond to the titanium composite oxide or the oxide of titanium, even if there is a flow of a solvent or ions of an electrolyte. As a result, of the composites according to the first embodiment, the composite, which include the active material particles including the carbon layer on the surface, can exhibit more excellent stability even if it is repeatedly subjected to charge and discharge in a nonaqueous electrolyte battery.

The carbon layer included in the active material particle preferably includes carbon in which an $sp^2$ hybrid orbital contributes to a covalent bond with an adjacent atom, in order to exhibit the n-n interaction, that is, the carbon layer preferably has a graphite structure. The carbon layer, however, may also include carbon in which an $sp^3$ hybrid orbital contributes to the covalent bond with an adjacent atom. In addition, the carbon layer can include an amorphous portion. Further, the carbon layer may include crystalline nanographite or a nanographene structure included in the amorphous carbon structure. Alternatively, the carbon layer may be graphene fragments having a diameter of about 20 nm to 200 nm.

The thicker the carbon layer on the surface of the active material particle, the higher the repetition stability. In addition, the repetition stability can be further improved by completely covering the surface of the active material particle. However, the higher the percentage of the carbon material in the composite, the lower the capacity. Additionally, the conductivity of the carbon layer is not as high as that of the graphene, and thus, an active material particle having a large amount of carbon layer has an increased electric resistance. Furthermore, when a large amount of carbon layer is included, there is a concern that the resistance to oxygen is reduced and ignitability is increased. For these reasons, the amount of the carbon layer included is preferably within a range of 0.01 to 5% by mass relative to the titanium composite oxide or the oxide of titanium. When the amount is within the range described above, excellent balance between the repetition stability and the capacity can be shown. The amount of the carbon layer included is more preferably 0.1 to 1% by mass.

[Confirmation Method]

The composite according to the first embodiment can be confirmed by the following method.

(Preparation of Measurement Sample)

A measurement sample, which is subjected to each analysis explained in detail below, can be prepared from a nonaqueous electrolyte battery by the following procedures.

First, the nonaqueous electrolyte battery is made to be in a discharged state. Then, the battery is disassembled in a glove box under an argon atmosphere. An electrode to be measured, for example a negative electrode, is taken out from the disassembled battery. The electrode, which has been taken out, is washed with methylethyl carbonate. The washed electrode is deactivated in water. After the electrode is dried, an electrode layer is separated therefrom. A composite including a negative electrode active material is extracted from the separated electrode layer using a centrifugal separator, or the like.

(Method of Separating Graphene Composite from Active Material Particles)

The extracted composite is subjected to ultrasonication in water for about one hour. The graphene structure including graphene, which is hydrophobic and light, floats to the water surface by this treatment, and thus it can be separated from the active material particle.

(Observation of Graphene Structure Form)

The form of the graphene structure can be observed, for example, using a scanning electron microscope (SEM) and a transmission electron microscope (TEM), as shown in FIGS. 4 to 7. In addition, the diameter and the length in the longitudinal direction of the graphene structure can be determined from an SEM image or TEM image.

(Method of Confirming Slant of Graphene Surface)

The slant of the graphene surface of the carbon material constituting the side surface of the graphene structure can be specifically confirmed as follows:

First, an image of a target sample to be measured, which is enlarged to 4,000,000 times, is photographed using a transmission electron microscope (TEM). Whereupon, the image is photographed so that the side surfaces of the graphene structure are within a visual field.

Figure 8:
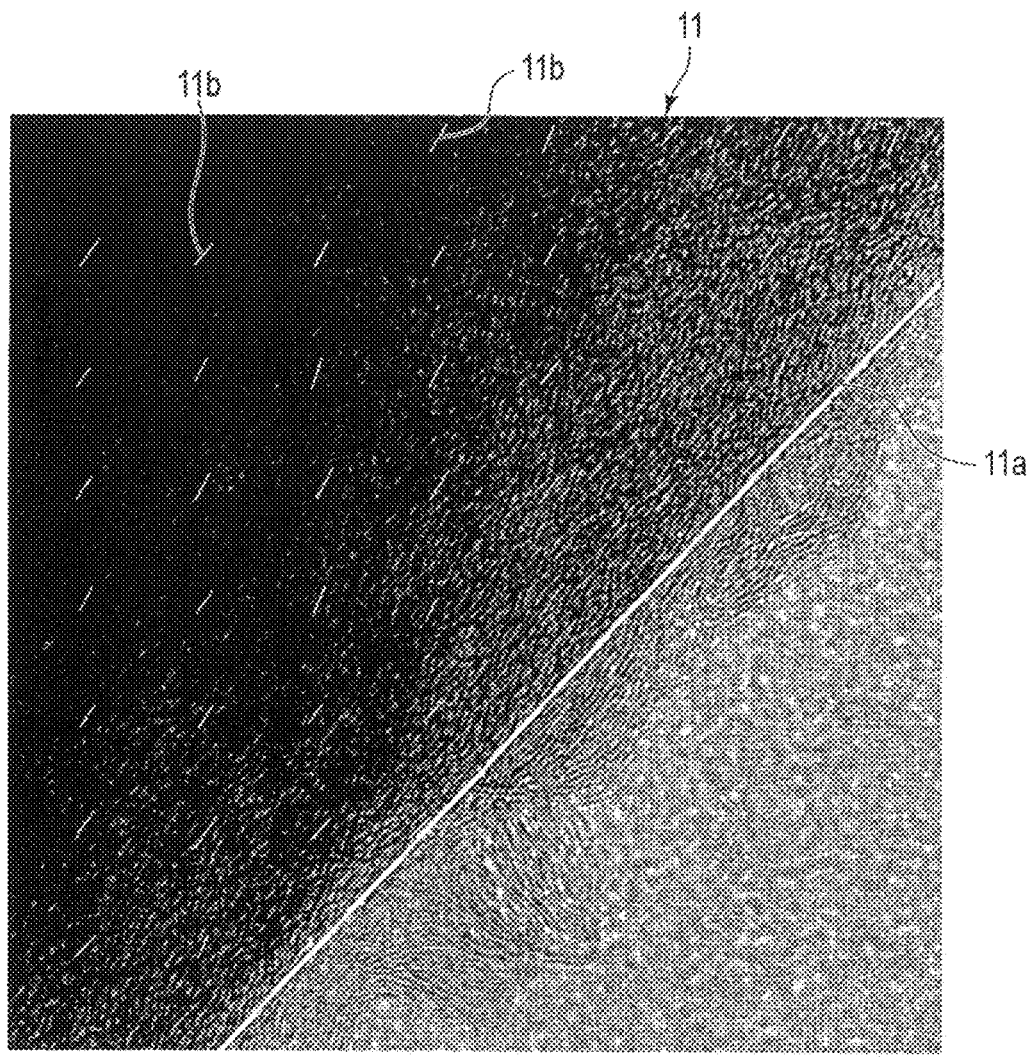
FIG. 8 is a transmission electron microscope (TEM) high magnification photograph of an example of graphene structures, which can be included in a composite according to a first embodiment.
Figure 9:
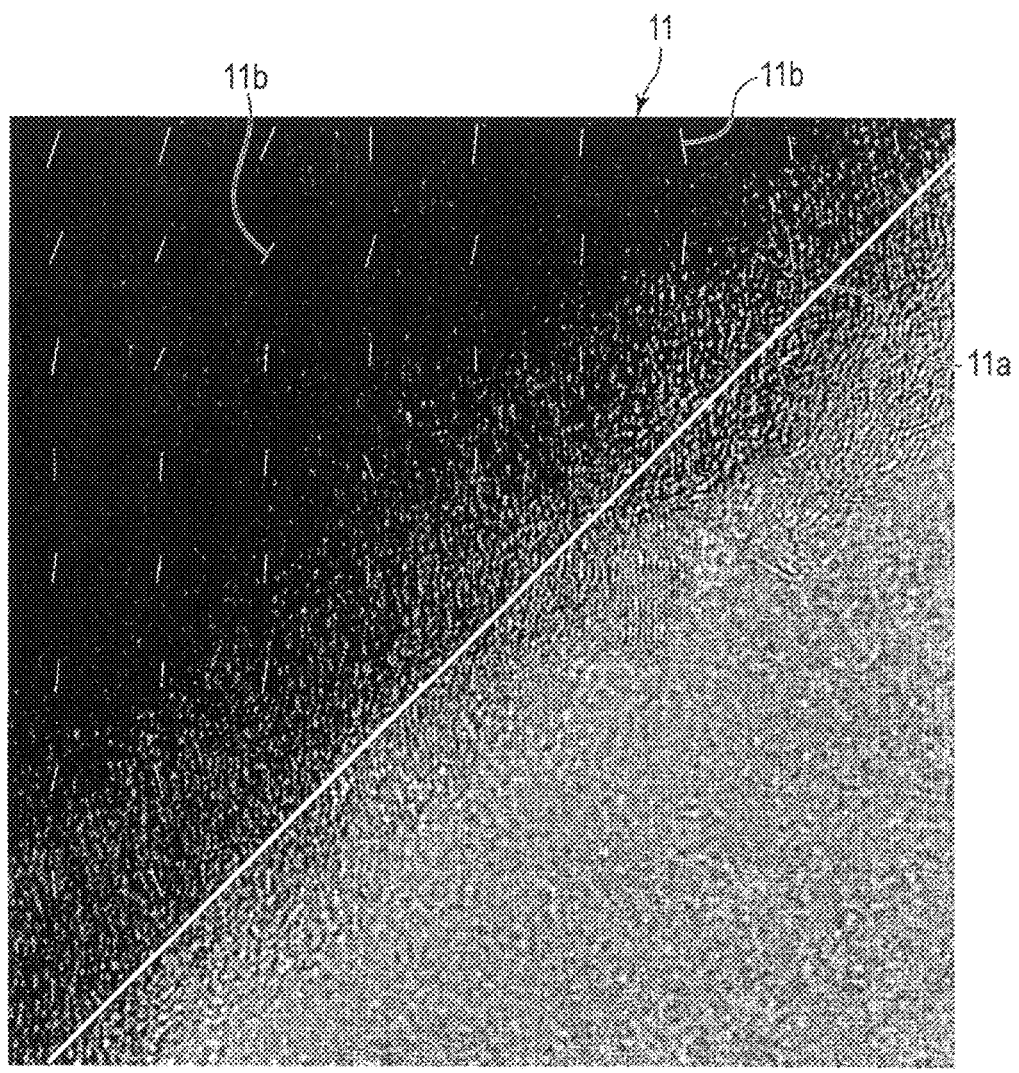
FIG. 9 is a transmission electron microscope (TEM) high magnification photograph of an example of graphene structures, which can be included in the composite according to a first embodiment at another site.
Figure 10:
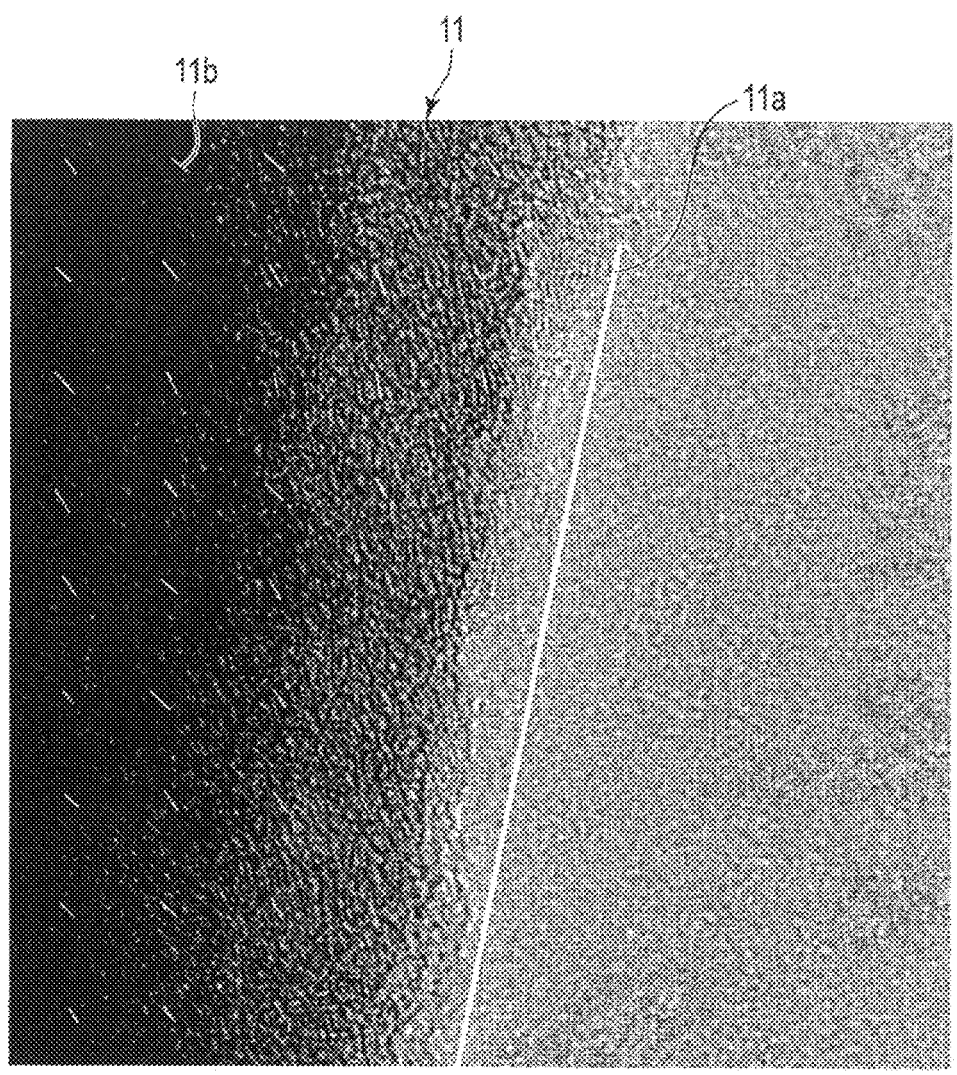
FIG. 10 is a transmission electron microscope (TEM) high magnification photograph of an example of graphene structures, which can be included in the composite according to a first embodiment at still another site.

In the TEM image of the graphene structure, darkness of color becomes gradually darker, in order, from an area including no carbon compound, then to the surface of the graphene structure, and followed by the interior of the graphene structure. Therefore, even if the structure of graphene on the outermost surface, that is, the side surface, of the graphene structure is disturbed, the direction of the side surface can be specified from the gradation in color in the photographed image. For example, FIGS. 8 to 10 show actual TEM images including side surfaces 11a of graphene structure 11. In FIGS. 8 to 10, a direction shown by a white line is the direction of the side surface 11a of the graphene structure 11.

The angle of slanting of the graphene surface of each carbon material to the side surface of the graphene structure can be confirmed as follows. First, the direction of each the graphene surface of each of the carbon material is confirmed from a lower magnification image. The confirmed direction of the graphene surface is compared with the direction of the side surface of the graphene structure determined from the gradation in color as described above, whereby slanting of the graphene surface of each carbon material can be confirmed. Specifically, lattice layers having 10×10 squares, such as that in the enlarged outline view of the carbon material of FIG. 3, is superimposed on an image, which is photographed for confirming the direction of the side surface of the graphene structure. Then, an angle between the graphene surface 11c of the carbon material 11b which is overlapped with an intersection of the lattice lines or the carbon material 11b which is the closest to the intersection, and the direction of the side surface 11a is measured. The angle of the graphene surface of each carbon material to the side surface of the graphene structure may be measured after the TEM image is converted into an outline view such as FIG. 3. In FIG. 3, the side surface 11a of the graphene structure 11 is depicted with a thick line drawn from the upper right toward the lower left of the drawing, and the carbon material 11b and the graphene surface 11c are depicted with thin lines. In addition, in FIG. 3, the graphene surface 21, which is a part of the target for measuring the angle, is depicted by a thick line. In areas where graphene cannot be observed, no measurement of the angle is necessary.

As shown in the outline view of FIG. 2, it is preferable that a position for photographing the TEM image is centered on each of a divided part, the divided parts obtained by dividing the graphene structure into three equal parts along the longitudinal direction. In addition, it is preferable that the three center points in the photographed areas are aligned in a straight line.

(Method of Analyzing Atoms Included in Graphene Structure)

The amount of each atom included in the carbon material can be measured by using an X-ray photoelectron spectroscopy (XPS). As the XPS apparatus, for example, Quantum-2000, manufactured by PHI, Inc. with monoclinic spectral AlKα ray as an X-ray source. Measurement is performed in the following conditions: Output: 40 W; Analysis Region: a diameter of 200 μm; Path Energy: Wide Scan-187.85 eV (1.60 eV/Step), and Narrow Scan-58.70 eV (0.125 eV/Step); Charge Neutralization Gun: Using both $Ar^+$ and $e^-$; and Geometry: θ=45° (θ: an angle between a sample surface and a detector). In order to prevent charge-up, conductive paths to a measurement sample are made using a conductive tape as necessary.

(Method of Confirming State of Carbon Layer Existing in Active Material Particle)

The state in which the carbon layer exists can be judged by a line analysis, carbon mapping, or the like using an electron probe micro analyzer (EPMA) of the surface or the cross-section of the composite.

A cross-section of the graphene layer can also be observed using a high-resolution transmission electron microscope (TEM), whereby an amorphous part and a nanographene structure can be identified, also. It is possible to observe the state of thin fragments of the graphene sheet using a scanning electron microscope (SEM).

The carbon bonding in the carbon layer can be identified from micro-Raman spectra. In particular, the graphene structure can be confirmed by existence of a G-peak and D-peak based on graphene, and sizes of the defect and the graphene domain can be obtained from a ratio of the G-peak and the D-peak.

(Observation of Active Material Particle Shape)

Figure 11:
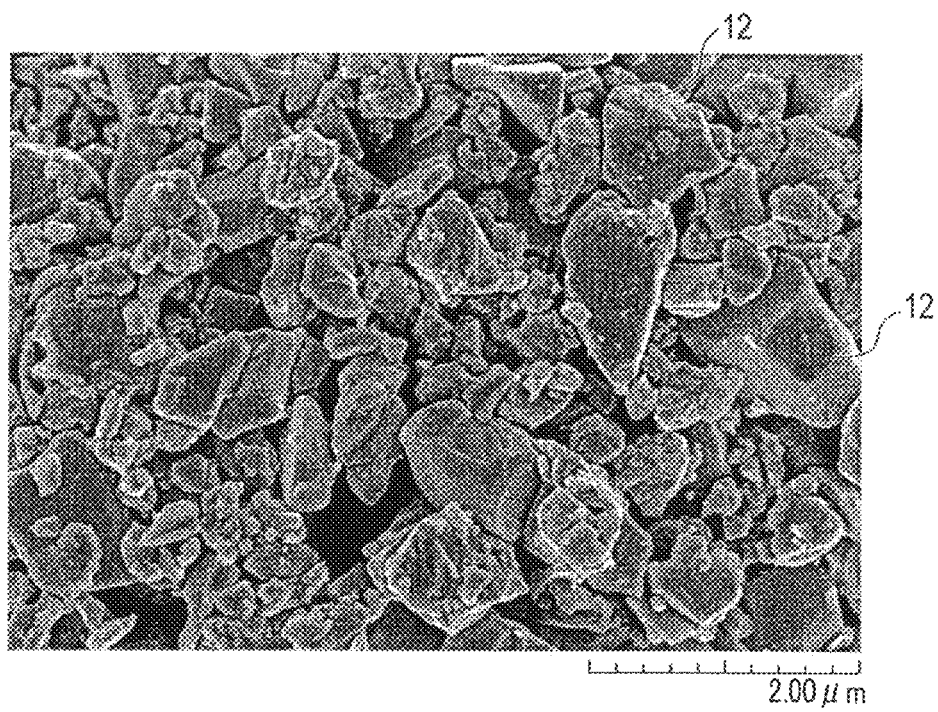
FIG. 11 is a scanning electron microscope (SEM) photograph showing an example of titanium-niobium composite oxide particles covered with a carbon layer.
Figure 12:
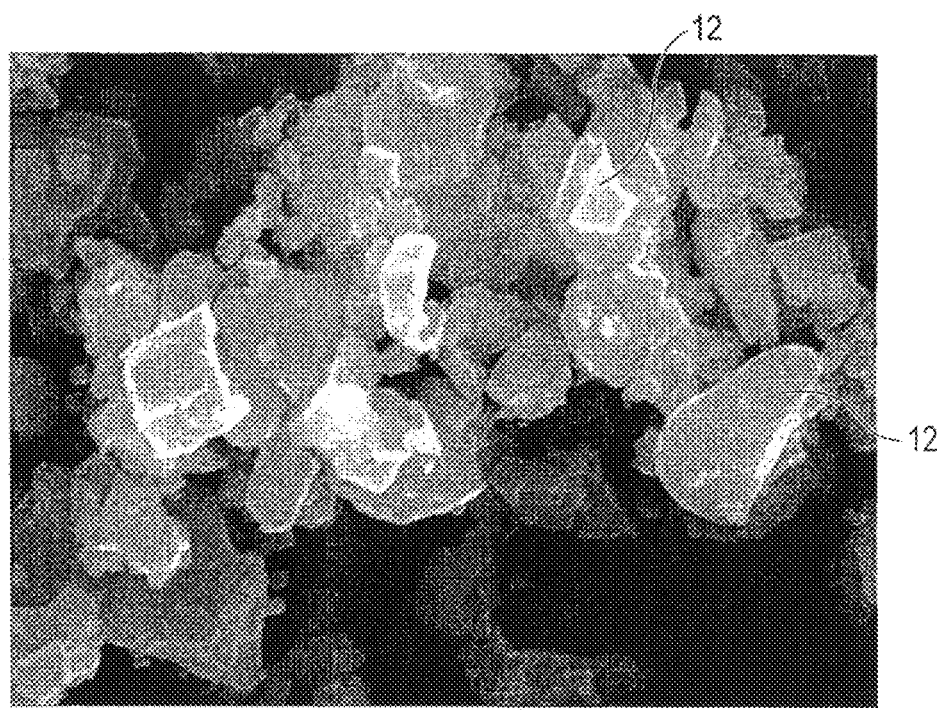
FIG. 12 is an SEM photograph showing an example of titanium-niobium composite oxide particles which are not covered with a carbon layer.

The active material particles can be observed by using SEM regardless of whether they are covered by a carbon layer or not. When the active material particle is covered with the carbon layer, the charge-up occurs with difficulty during SEM measurement, and thus such a particle appears as a dark particle on the SEM image. FIG. 11 shows an SEM image of a titanium-niobium oxide particle whose surface is covered with the carbon layer, which is one example of the active material particles 12. On the other hand, FIG. 12 is an SEM image showing a titanium-niobium oxide particle, which is an active material particle 12 whose surface is not covered with the carbon layer. Comparing FIG. 11 with FIG. 12, the titanium-niobium oxide particles in FIG. 12 appear as a brighter image than those in FIG. 11, but it is found that the particles have the same form as those in FIG. 11.

(Composition Analysis of Active Material)

The composition of the active material included in the active material particle can be analyzed by inductively coupled plasma atomic emission spectroscopy (ICP-AES).

(Method of Measuring Average Particle Size of Secondary Particle of Active Material Particle)

A method for measuring an average particle size of a secondary particle of an active material particle is as follows. As a measuring device, a particle distribution analyzing device using a laser diffraction method (Shimadzu SALD-300) is used. First, about 0.1 g of a sample, a surfactant, and 1 to 2 mL of distilled water are added to a beaker, and the mixture is thoroughly stirred. The thus obtained mixed solution is injected into a water tank being stirred, and a sample solution is prepared here. Using the sample solution, a luminous intensity distribution is measured 64 times at intervals of 2 seconds, then the particle size distribution data is analyzed.

(Method of Confirming Average Particle Size of Primary Particles of Active Material Particles)

The average primary particle size of the active material particles can be confirmed by observation with a scanning electron microscope (SEM). An average particle size of 10 typical particles, extracted from a typical visual field, is obtained to determine the average primary particle size.

(Method of Measuring Specific Surface Area of Active Material Particle)

As the measurement of a specific surface area of the active material particle, a method can be used in which a molecule of a known area of adsorption occupancy is adsorbed on the powder particle surface at a temperature of liquid nitrogen, and a specific surface area of the sample is obtained from the adsorption amount. A BET method utilizing a physical adsorption of inert gas at a low temperature under a low humidity is most often utilized. The BET theory, which extends a Langmuir theory, which is a monomolecular layer adsorption theory, to a multi-molecular layer adsorption, is the most famous theory as a calculation method of a specific surface area. The specific surface area obtained from this theory is referred to as a BET specific surface area.

According to the first embodiment as explained above, the composite including the plurality of the active material particles and the graphene structure is provided. In the composite according to the first embodiment, excellent bonding between the plurality of the active material particles and the graphene structure can be exhibited. As a result, by using the composite according to the first embodiment, a nonaqueous electrolyte battery that can exhibit excellent capacity retention can be realized.

The composite according to the first embodiment may be used in a negative electrode or a positive electrode of a nonaqueous electrolyte battery. In either case, the nonaqueous electrolyte battery using the composite according to the first embodiment can exhibit excellent capacity retention.

When the composite according to the first embodiment is used in the positive electrode, as an active material of the negative electrode, for example, metal lithium or lithium alloy, or carbon materials such as graphite and coke may be used.

Second Embodiment

According to a second embodiment, there is provided a method of manufacturing a composite. The method includes preparing a plurality of active material particles of a titanium composite oxide or an oxide of titanium. The manufacturing method further includes preparing graphene structures including a plurality of carbon materials including a graphene oxide. The preparation of the graphene structure includes producing carbon fibers by a chemical vapor deposition using metal particles having a diameter of 30 nm to 500 nm as a catalyst, and oxidizing the carbon fibers. The manufacturing method further includes mixing the plurality of the active material particles with the graphene structures to obtain a mixture, and sintering the mixture under an inert gas atmosphere to obtain a composite.

A method for manufacturing the composite according to a second embodiment will be explained below.

[Preparation of Active Material Particle]

First, a plurality of active material particles of a titanium composite oxide or an oxide of titanium is prepared.

For example, the plurality of the active material particles including a titanium-niobium composite oxide can be prepared by the following procedures.

First, starting materials are mixed. As the starting material, an oxide such as titanium dioxide or niobium pentoxide may be used. Alternatively, a salt including titanium or niobium may be used as the starting material. As the salt used as the starting material, salts capable of decomposing at a comparatively low temperature to form an oxide, such as hydroxide salts, carbonates and nitrates, are preferable. For example, niobium hydroxide, and the like, may be used.

Next, the mixture, obtained by mixing the starting materials, is pulverized to obtain a mixture that is as uniform as possible. Then, the obtained mixture is sintered. The sintering can be performed at a temperature range of 900 to 1400° C. for a total of 1 to 100 hours. The titanium-niobium composite oxide can be obtained in the steps described above.

The titanium-niobium composite oxide obtained by the above steps can be represented, for example, by a general formula: $Li_xTi_{1-y}M1_yNb_{2-z}M2_zO_7$. Here, M1 is at least one element selected from the group consisting of Zr, Si and Sn. M2 is at least one element selected from the group consisting of V, Nb, Ta and Bi.

Here, the element M1 and the element M2 may be included in the titanium-niobium composite oxide, for example, by including them in the starting materials. The values of y and z can be within ranges of $0 \leq y \leq 1$ and $0 \leq z \leq 2$, respectively.

The index x can be controlled by including a compound that includes Li in the starting material. The index x can be within a range of $0 \leq x \leq 5$.

[Preparation of Graphene Structure]

The graphene structure including the plurality of the carbon materials including the graphene oxide can be prepared, for example, as follows:

First, carbon fibers are prepared. The carbon fiber may be manufactured by a chemical vapor deposition (CVD) method using metal particles as a catalyst and supplying gases such as methane, hydrogen and argon, and the like. It is preferable to use at least one metal of iron, cobalt and nickel as the metal particle. Of these, it is more preferable to use iron. Metal particles having a diameter of 30 nm to 500 nm are used. The diameter of the obtained carbon fiber can be controlled by the diameter of metal particles used as the catalyst. When metal particles having a diameter within the range described above are used, the production of carbon nanotubes can be prevented, and controlling of particle size can be prevented from becoming difficult.

Subsequently, concentrated sulfuric acid and sodium nitrate are mixed to prepare a mixed liquid. The mixed liquid is cooled to about 5° C. Next, while the temperature of the mixed liquid is kept at about 5° C., the carbon fibers prepared above are gradually added to this mixed liquid.

Next, while the mixed liquid is cooled, potassium permanganate powder is gradually added to the mixed liquid. Due to this, the temperature of the reaction solution rises to about 10° C. Next, the reaction solution is stirred at room temperature for about 4 hours, to which water is then gradually added, and the mixture is heated under reflux for 30 minutes. The heated reaction solution is cooled to room temperature, and then a hydrogen peroxide solution is added dropwise to the reaction solution.

Subsequently, the obtained reaction mixture is centrifuged to recover a precipitate. The recovered precipitate is washed several times with dilute hydrochloric acid, and then centrifuged. Finally, the product obtained by the centrifugation is dried by heating at 80° C. under vacuum. Thus, a graphene structure formed by densely laminating the oxidized graphene can be obtained.

The thickness and diameter of the obtained graphene structure and the degree of oxidation of the included graphene can be controlled by controlling the carbon fibers, which are the starting material, and the reaction conditions.

An angle of slanting of the graphene surface of the carbon material constituting the side surface of the graphene structure to the side surface of the graphene structure can be controlled, for example, by CVD conditions, and the kind and the particle size of the catalyst.

[Mixing of Active Material Particles with Graphene Structure]

Subsequently, the active material particles and the oxidized graphene structures, prepared as described above, are mixed. Either dry-mixing or wet-mixing may be applied to the mixing.

In the case of the wet-mixing, the pH of the mixed solution is preferably adjusted to an acidic range. This is because, when the pH is within a weak acidic to neutral or alkaline range, both the graphene structures and the active material particles are apt to become negatively charged. In such a case, the graphene structures and the active material particles electrically repel each other. The electrical repulsion can be prevented by adjusting the pH of the mixed solution to the acidic range.

When wet-mixing is used, a solid mixture can be obtained by removing water from the mixture using an evaporator to dry and solidify the mixture.

In addition to the active material particles and the graphene structures, it is also possible to further mix a compound having a polyhydric hydroxyl group.

Organic compounds having a polyhydric hydroxyl group include, for example, various saccharides. For example, disaccharides such as sucrose, lactose, maltose, trehalose, kojibiose, nigerose, sophorose, laminaribiose, and cellobiose; monosaccharides such as glucose, fructose, allose, ribose, and apiose; oligosaccharides; glycerin; sorbitol; and polysaccharides can be cited. Of these, disaccharides such as sucrose, lactose and maltose are particularly preferable.

In particular, by further mixing sucrose and, for example, dispersing the sucrose in water, a more uniform mixture can be prepared. Sucrose, which is neutral, can cross-link with hydrogen bonds to exert an effect that can be described as that of glue, and as a result, the uniform mixture can be prepared. Such an effect is not limited in water, and can be similarly exhibited in a solid phase. Specifically, by heating a mixture including sucrose in a solid phase, the sucrose melts, and as a result, the uniform mixture can be provided by the effect of the hydrogen bonds.

In a case in which the compound having a polyhydric hydroxyl group is further mixed, for example, the graphene structure, the active material particles, and, for example, sucrose, as the organic compound having a polyhydric hydroxyl group, are dispersed in water and thoroughly mixed.

Alternatively, in addition to or instead of the compound having a polyhydric hydroxyl group, graphene fragments having a diameter of about 20 nm to 200 nm may be mixed with the active material particles and the graphene structure.

The solid mixture obtained by the wet-mixing or the mixture obtained by the dry-mixing may be pulverized into a powder, if necessary.

[Sintering Under Inert Gas Atmosphere]

The thus obtained mixture or powder is next sintered under an inert gas atmosphere. For example, the mixture obtained as described above is heated at 700° C. to 1000° C. for one hour under stream of inert gas. The thus obtained product is pulverized and mechanically stirred, whereby a composite can be obtained. The edge surfaces of the graphene structure can be further activated by the mechanical stirring, and as a result, the active material particles can be bonded to the graphene structures at a higher degree.

According to the method for manufacturing the composite of the second embodiment, it is possible to manufacture, for example, the composite according to the first embodiment. According to the method for manufacturing the composite of the second embodiment, therefore, the composite that allows the realization of the nonaqueous electrolyte battery, which can exhibit excellent capacity retention, can be manufactured.

Third Embodiment

According to a third embodiment, there is provided a nonaqueous electrolyte battery active material. The active material includes the composite according to the first embodiment.

As stated in the explanation of the first embodiment, the composite according to the first embodiment may be used in the negative electrode or the positive electrode of the nonaqueous electrolyte battery.

When the nonaqueous electrolyte battery active material according to the third embodiment is used as the negative electrode active material, the composite according to the first embodiment may be included alone, or another active material may be further included, the other active material being different from the active material included in the active material particles of the composite according to the first embodiment. The other active material described above may include, for example, lithium titanium composite oxides having a spinel structure ($Li_4Ti_5O_{12}$, and the like); titanium oxides having an anatase structure, a rutile structure, or a monoclinic β-type structure (a-$TiO_2$, r-$TiO_2$, $TiO_2$(B), and the like); and iron composite sulfides (FeS, $FeS_2$, and the like).

The nonaqueous electrolyte battery active material according to the third embodiment includes the composite according to the first embodiment. As a result, the nonaqueous electrolyte battery active material according to the third embodiment can allow the nonaqueous electrolyte battery capable of exhibiting excellent capacity retention to be realized.

Fourth Embodiment

According to a fourth embodiment, there is provided a nonaqueous electrolyte battery. The nonaqueous electrolyte battery includes a positive electrode, a negative electrode and a nonaqueous electrolyte. The negative electrode includes the active material according to the third embodiment.

The negative electrode may include a negative electrode current collector, and a negative electrode layer(s) formed on both surfaces or one surface thereof. The nonaqueous electrolyte battery active material according to the third embodiment may be included in the negative electrode layer as the negative electrode active material. The negative electrode may further include a negative electrode tab. For example, a portion of the negative electrode current collector, whose surface does not have the negative electrode layer applied thereto, can function as the negative electrode tab. Alternatively, the negative electrode may include a negative electrode tab that is a separate entity from the negative electrode current collector, which is electrically connected to the negative electrode current collector.

The positive electrode may include a positive electrode current collector, and a positive electrode layer(s) formed on both surfaces or one surface thereof. The positive electrode layer may include a positive electrode active material. The positive electrode may further include a positive electrode tab. For example, a portion of the positive electrode current collector, whose surface does not have the positive electrode layer applied thereto, can function as the positive electrode tab. Alternatively, the positive electrode may include a negative electrode tab that is a separate entity from the positive electrode current collector, which is electrically connected to the positive electrode current collector.

The contact between the negative electrode layer and the positive electrode layer can be prevented, for example, by sandwiching a separator in between.

The negative electrode, the positive electrode, and, for example, the separator can form an electrode group. The form of the electrode group is not particularly limited. The electrode group may have, for example, a stacked structure. In the stacked structure, a plurality of negative electrodes and a plurality of positive electrodes are stacked in a state in which the negative electrode layer is separated from the positive electrode layer. Alternatively, the electrode group may have a wound structure. The wound structure is a structure formed by winding a laminate around a winding axis, the laminate being obtained by laminating one or more positive electrodes and one or more negative electrodes while preventing contact between the positive electrode layer and the negative electrode layer.

The nonaqueous electrolyte battery according to the fourth embodiment may further include a container. The electrode group and the nonaqueous electrolyte may be housed in the container.

The nonaqueous electrolyte battery according to the fourth embodiment may further include a positive electrode terminal and a negative electrode terminal. The positive electrode terminal may be electrically connected to the positive electrode. The negative electrode terminal may be electrically connected to the negative electrode.

The nonaqueous electrolyte battery according to the fourth embodiment may include as a charge carrier, for example, lithium ions, sodium ions, or magnesium ions.

Next, each comprising member of the nonaqueous electrolyte battery according to the fourth embodiment will be explained in detail.

1) Container

The form of the container is selected depending on the use of the battery, and may be selected from, for example, a flat form (thin form), a rectangular form, a cylindrical form, a coin form, and a button form. Examples of the container include, depending on the battery size, for example, containers for a small battery loaded on a portable electronic equipment, containers for a large battery loaded on two- to four-wheeled vehicles, and the like.

The container may be formed from, for example, a laminate film having a thickness of 0.5 mm or less. Alternatively, a metal container having a thickness of 1.0 mm or less may also be used as the container. It is more preferable that the metal container has a thickness of 0.5 mm or less.

As the laminate film, a multi-layer film in which a metal layer mediates between resin layers is used. An aluminum foil or an aluminum alloy foil is preferable as the metal layer to reduce weight. As the resin layer, for example, a polymeric material such as polypropylene (PP), polyethylene (PE), nylon, polyethylene terephthalate (PET) may be used. The laminate film can be molded into the shape of the container by thermally sealing the laminate film.

The metal container may be made from, for example, aluminum, aluminum alloy, or the like. As the aluminum alloy, an alloy including an element such as Mg, Zn, or Si is preferable. When a transition metal such as Fe, Cu, Ni, or Cr is included in the alloy, the content of the transition metal is preferably adjusted to 100 ppm or less by mass.

2) Negative Electrode

The negative electrode layer may further include a binder, in addition to the nonaqueous electrolyte battery active material according to the third embodiment.

The binder acts to bind the negative electrode layer to the current collector. Examples of the binder may include polytetrafluoroethylene (PTFE), polyvinylidene fluoride (PVdF), fluororubber, and styrene-butadiene rubber.

In addition to the graphene structure according to the first embodiment and the optional carbon layer, the negative electrode layer may include an additional conductive agent. Examples of the additional conductive agent include carbon nanotube and carbon fiber.

It is preferable that the active material, the conductive agent, and the binder are blended in the negative electrode layer at contents of 70% to 96% by mass, 2% to 28% by mass, and 2% to 28% by mass, respectively. Here, the content of the conductive agent includes masses of the graphene structure according to the first embodiment and the optional carbon layer. By adjusting the content of the conductive agent to 2% by mass or more, the current collection performance in the negative electrode layer can be improved, and thereby, the large current characteristic of the nonaqueous electrolyte battery can be improved. By adjusting the content of the binder to 2% by mass or more, the binding property between the negative electrode layer and the current collector is increased, and thus the cycle characteristic can be further improved. On the other hand, it is preferable to adjust each of the contents of the conductive agent and the binder to 28% by mass or less to achieve increased capacity.

It is preferable that the current collector is electrically stable at a potential range higher than 1 V (vs. Li/Li$^+$). The current collector is preferably an aluminum foil, or an aluminum alloy foil including an element such as Mg, Ti, Zn, Mn, Fe, Cu, or Si.

The negative electrode is manufactured, for example, by dispersing the active material, the binder, and the optional conductive agent in a commonly used solvent to prepare a slurry, applying the resultant slurry to the current collector to obtain a coating of applied slurry, drying the coating, and then applying a press to the dried coating. When applying the slurry, by providing a portion on the current collector where the slurry is not applied, a part of the current collector may be used as the negative electrode tab. The negative electrode may also be manufactured by forming the active material, the binder, and the optional conductive agent into pellets, and forming the pellets, as the negative electrode layer, onto the current collector.

3) Positive Electrode

The positive electrode layer may include, for example, a positive electrode active material, a conductive agent, and a binder.

As the positive electrode active material, for example, oxides and polymers may be used.

The oxide, which can be used as the positive electrode active material, may include, for example, manganese dioxide ($MnO_2$), iron oxide, copper oxide and nickel oxide, which has absorbed lithium, lithium-manganese composite oxides (such as $Li_xMn_2O_4$, and $Li_xMnO_2$), lithium-nickel composite oxides (such as $Li_xNiO_2$), lithium-cobalt composite oxides ($Li_xCoO_2$), lithium-nickel-cobalt composite oxides (such as $LiNi_{1-y}Co_yO_2$), lithium-manganese-cobalt composite oxides (such as $Li_xMn_yCo_{1-y}O_2$), lithium-manganese-nickel composite oxides having a spinel structure ($Li_xMn_{2-y}Ni_yO_4$), lithium-phosphorus oxide having an olivine structure (such as $Li_xFePO_4$, $Li_xFe_{1-y}Mn_yPO_4$, and $Li_xCoPO_4$), iron sulfate ($Fe_2(SO_4)_3$), and vanadium oxide (such as $V_2O_5$). It is preferable that x and y, described above, are within a range of $0 \leq x \leq 1$ and $0 \leq y \leq 1$.

The polymer, which can be used as the positive electrode active material, may include, for example, conductive polymer materials such as polyaniline and polypyrrole, and disulfide polymer materials. Sulfur (S) and fluorocarbon may also be used as the positive electrode active material.

Examples of the preferable active material include lithium-manganese composite oxide ($Li_xMn_2O_4$), lithium-nickel composite oxide ($Li_xNiO_2$), lithium-cobalt composite oxide ($Li_xCoO_2$), lithium-nickel-cobalt composite oxide ($Li_xNi_{1-y}Co_yO_2$), lithium-manganese-nickel composite oxide having a spinel structure ($Li_xMn_{2-y}Ni_yO_4$), lithium-manganese-cobalt composite oxide ($Li_xMn_yCo_{1-y}O_2$), and lithium iron phosphate ($Li_xFePO_4$), which can exhibit a high positive electrode voltage. It is preferable that x and y, described above, are within a range of $0<x \leq 1$ and $0 \leq y \leq 1$.

The more preferable positive electrode active materials are lithium-cobalt-composite oxides and lithium-manganese composite oxides. These active materials have a high ion conductivity, when used in combination with the above described negative electrode active material, it becomes unlikely for the diffusion of lithium ions in the positive electrode active material to be rate limiting.

The conductive agent enhances the current collection performance of the active material, and suppresses the contact resistance between the active material and the current collector. Examples of the conductive agent include carbonaceous substances such as acetylene black, carbon black, graphite, graphene, and carbon nanotube.

The binder binds the active material to the conductive agent. Examples of the binder include polytetrafluoroethylene (PTFE), polyvinylidene fluoride (PVdF), and fluororubber.

It is preferable that the active material, the conductive agent, and the binder are blended in the positive electrode layer at contents of 80% to 95% by mass, 3% to 18% by mass, and 2% to 17% by mass, respectively. When the content of the conductive agent is adjusted to 3% by mass or more, the effects described above can be sufficiently exhibited. When the content of the conductive agent is adjusted to 18% by mass or less, the decomposition of the nonaqueous electrolyte on the surface of the conductive agent during storage under high temperature can be reduced. When the content of the binder is adjusted to 2% by mass or more, sufficient positive electrode strength can be obtained. When the content of the binder is adjusted to 17% by mass or less, the blending amount of the binder, which is an insulating material in the positive electrode, can be reduced, thus internal resistance can be reduced.

The current collector is preferably, for example, an aluminum foil, or an aluminum alloy foil including an element such as Mg, Ti, Zn, Mn, Fe, Cu or Si.

The positive electrode is manufactured, for example, by dispersing the active material, the conductive agent, and the binder in a commonly used solvent to prepare a slurry, applying the resulting slurry to the current collector to obtain a coating of applied slurry, drying the coating, and then applying a press to the dried coating. When applying the slurry, by providing a portion on the current collector where the slurry is not applied, a part of the current collector may be used as the positive electrode tab. Alternatively, the positive electrode may also be manufactured by forming the active material, the conductive agent, and the binder into pellets, and forming the pellets, as the positive electrode layer, onto the current collector.

4) Nonaqueous Electrolyte

As the nonaqueous electrolyte, for example, a liquid nonaqueous electrolyte, prepared by dissolving an electrolyte in an organic solvent, or a gel-form nonaqueous electrolyte constituted of the liquid electrolyte and a polymeric material may be used.

The liquid nonaqueous electrolyte in which the electrolyte is dissolved in an organic solvent at a concentration of 0.5 M to 2.5 M is preferable.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bistrifluoromethylsulfonylimide [$LiN(CF_3SO_2)_2$], and mixtures thereof. It is preferable that, even at a high potential, the electrolyte does not easily oxidize, and $LiPF_6$ is the most preferable.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2MeTHF), dioxolane (DOX); linear ethers such as dimethoxyethane (DME) and diethoxyethane (DEE); γ-butyrolactone (GBL), acetonitrile (AN), and sulfolane (SL). These organic solvents may be used alone or as a mixed solvent.

Examples of the polymeric material include polyvinylidene fluoride (PVdF), polyacrylonitrile (PAN), and polyethylene oxide (PEO).

The preferable organic solvent is a mixed solvent obtained by mixing at least two solvents selected from the group consisting of propylene carbonate (PC), ethylene carbonate (EC), and diethyl carbonate (DEC), or a mixed solvent including γ-butyrolactone (GBL). By using a mixed solvent as such, a nonaqueous electrolyte battery having excellent high temperature characteristics can be obtained.

Needless to say, when ions other than lithium ion are used as the charge carrier, nonaqueous electrolytes which correspond to the ions functioning as the charge carrier may be used.

5) Separator

As the separator, for example, a porous film or a nonwoven fabric made of synthetic resin, which include polyethylene, polypropylene, cellulose, or polyvinylidene fluoride (PVdF), may be used. The porous film is preferably formed from polyethylene or polypropylene. The porous film described above is capable of melting at a given temperature to cut off current, and thus can improve safety.

6) Positive Electrode Terminal and Negative Electrode Terminal

As a material for the positive electrode terminal, for example, a material having electrical stability and conductivity in an electric potential range of 3 to 4.25 V vs. $Li/Li^+$ can be used. Specific examples thereof include aluminum, and aluminum alloy including an element such as Mg, Ti, Zn, Mn, Fe, Cu, or Si. In order to reduce contact resistance between the positive electrode terminal and the positive electrode current collector, the positive electrode terminal is preferably made of the same material as the positive electrode current collector.

As a material for the negative electrode terminal, for example, a material having electrical stability and conductivity in an electric potential range of 1 V to 3 V vs. $Li/Li^+$ can be used. Specific examples thereof include aluminum, and aluminum alloy including an element such as Mg, Ti, Zn, Mn, Fe, Cu, or Si. In order to reduce the contact resistance between the negative electrode terminal and the negative electrode current collector, the negative electrode terminal is preferably made of the same material as the negative electrode current collector.

Next, one example of the nonaqueous electrolyte battery according to the fourth embodiment will be explained in detail, referring to FIG. 13 and FIG. 14.

Figure 13:
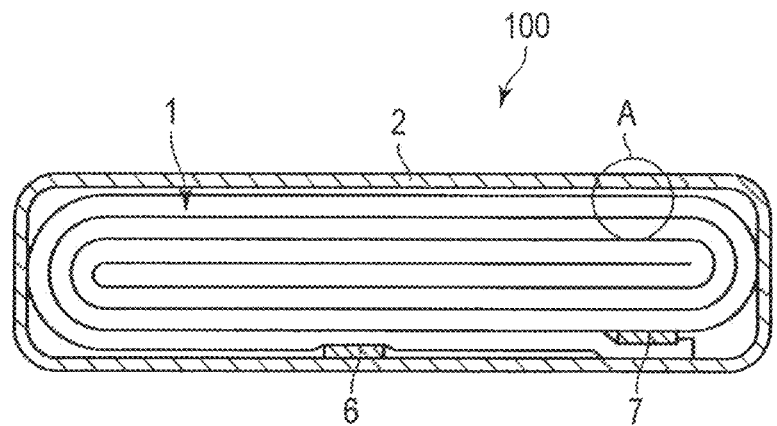
FIG. 13 is a schematic cross-sectional view showing an example of nonaqueous electrolyte batteries according to a fourth embodiment.

FIG. 13 is cross-sectional view showing a flat nonaqueous electrolyte battery whose container is formed of a laminate film. FIG. 14 is an enlarged cross-sectional view of part A in FIG. 13. Each drawing is a typical view for description. Though there are parts different from an actual battery in shape, dimension, and ratio, these structural designs may be properly changed taking the following explanations and known technologies into consideration.

Figure 14:
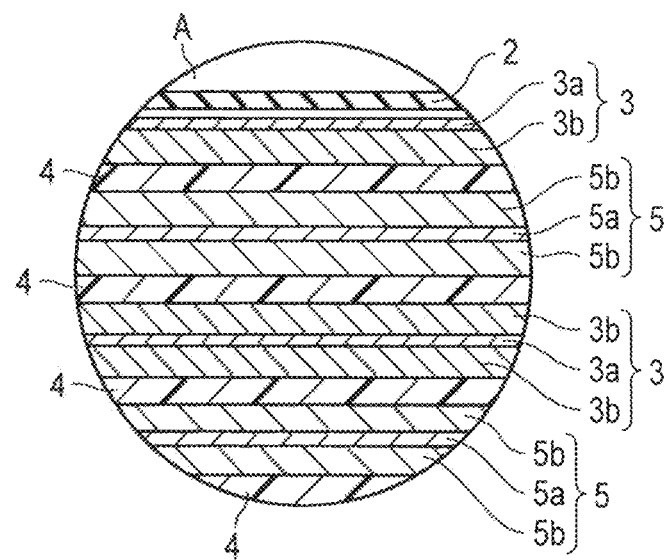
FIG. 14 is an enlarged cross-sectional view of part A in FIG. 13.

The nonaqueous electrolyte battery 100, shown in FIG. 13 and FIG. 14, includes a flat, wound electrode group 1, a bag-like container 2, and nonaqueous electrolyte, which is not shown. The flat, wound electrode group 1 is housed in the bag-like container 2. The nonaqueous electrolyte is also housed in the bag-like container 2, and a portion thereof is sustained in the wound electrode group 1.

The flat, wound electrode group 1 is formed by spirally winding a laminate, in which a negative electrode 3, a separator 4, a positive electrode 5, and the separator 4 are laminated in this order from the outside, and performing press-molding of the wound laminate.

As shown in FIG. 14, the outermost negative electrode 3 has a structure in which a negative electrode layer 3b is formed on one inner surface of the negative electrode current collector 3a. The other negative electrodes 3 have a structure in which the negative electrode layers 3b are formed on both surfaces of the negative electrode current collector 3a. The positive electrode 5 has a structure in which the positive electrode layers 5b are formed on both surfaces of the positive electrode current collector 5a.

As shown in FIG. 14, in the vicinity of the periphery of the wound electrode group 1, a negative electrode terminal 6 is electrically connected to the negative electrode current collector 3a in the outermost negative electrode 3, and a positive electrode terminal 7 is electrically connected to a positive electrode current collector 5a in the positive electrode 5 located on the inside. The negative electrode terminal 6 and the positive electrode terminal 7 extend outward from an opening in the bag-like container 2.

The nonaqueous electrolyte battery 100 shown in FIG. 13 and FIG. 14 can be manufactured, for example, by the method described below. First, the wound electrode group 1, which is electrically connected to the negative electrode terminal 6 and the positive electrode terminal 7, is housed in the container 2 having an opening. Whereupon, a part of each of the negative electrode terminal 6 and the positive electrode terminal 7 are made to extend out of the container 2. Subsequently, heat-sealing is performed in a state in which the negative electrode terminal 6 and the positive electrode terminal 7 are sandwiched by the container 2 at the opening, and a part of the opening of the container 2 is left unsealed. Next, liquid nonaqueous electrolyte is injected into the container 2 through the part where the container 2 is had not been sealed. Thereafter, the part of the container 2 through which the nonaqueous electrolyte had been injected is sealed, whereby the wound electrode group 1 and the liquid nonaqueous electrolyte can be completely sealed in the bag-like container 2.

The nonaqueous electrolyte battery according to the fourth embodiment includes the active material according to the third embodiment, and thus it can exhibit excellent capacity retention.

EXAMPLES

Example 1

In Example 1, a test electrode of Example 1 is manufactured by the following procedures.

[Synthesis of Titanium-Niobium Composite Oxide as Active Material Particle]

A titanium dioxide ($TiO_2$) powder having an anatase structure and a niobium pentoxide ($Nb_2O_5$) powder are prepared as starting materials. $TiO_2$ and $Nb_2O_5$ are mixed in a ratio of 1:3.3 by mass to obtain a mixture. The thus obtained mixture is sintered at 1100° C. for 24 hours. After sintering, the product is pulverized to obtain a product powder.

Next, a portion of the product powder is subjected to an analysis according to a wide-angle X-ray diffraction method explained below.

<Wide-Angle X-Ray Diffraction Method>

A portion of the product powder is packed into a standard glass holder having a diameter of 25 mm, and measurement is performed according to the wide-angle X-ray diffraction method. An apparatus and conditions used in the measurement are shown below.
(1) X-ray generator manufactured by Rigaku Corporation RU-200R (rotating anticathode)
X-ray source: CuKα rays
A curved crystal monochromator (graphite) is used.
Output: 50 kV, 200 mA
(2) Goniometer manufactured by Rigaku Corporation 2155S2 model
Slit system: 1°-1°-0.15 mm-0.45 mm
Detector: Scintillation counter
(3) Count recording device manufactured by Rigaku Corporation RINT 1400 model
(4) Scanning method 2θ/θ continuous scanning
(5) Qualitative analysis
Measurement range (2θ) 5 to 100°
Scanning speed 2°/minute
Step width (2θ) 0.02°

Figure 15:
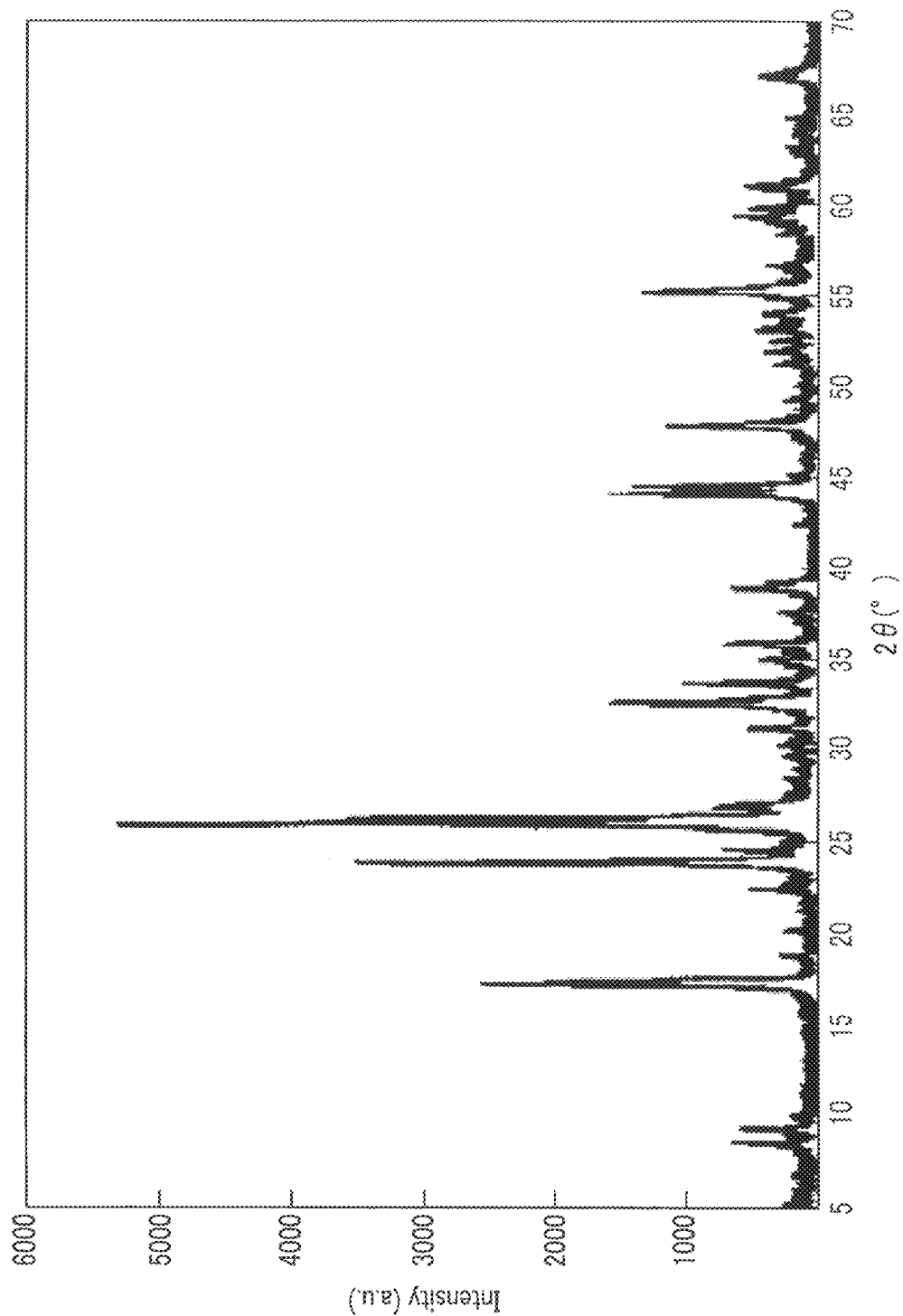
FIG. 15 is an X-ray diffraction pattern of a niobium composite oxide ($TiNb_2O_7$) in Example 1.

As a result, an X-ray diffraction pattern, shown in FIG. 15, is obtained. From the diffraction pattern, it can be confirmed that the obtained product has the same crystal structure as that of a monoclinic titanium-niobium composite oxide (space group: C/2m), represented by a compositional formula $TiNb_2O_7$, attributed to JCPDS (Joint Committee on Powder Diffraction Standards): #39-1407.

A portion of the obtained product is subjected to an ICP-AES analysis. From the results thereof and the results of the X-ray analysis, it is found that the obtained product is a monoclinic titanium-niobium composite oxide represented by a compositional formula $TiNb_2O_7$.

[Preparation of Graphene Structure]

Using fine particles of iron having a diameter of 100 to 400 nm as a catalyst, a thermal CVD is performed by supplying a stream including methane, hydrogen and argon. When a portion of a product obtained therefrom is observed using SEM, it is found that the obtained product is a plurality of nanofibers having a diameter of 100 to 400 nm.

Next, one mole of sulfuric acid and 0.15 mole of nitric acid are mixed to prepare mixed liquid. The resulting mixed liquid is cooled to 5° C. The nanofibers obtained above are gradually added to the mixed liquid while the temperature of the mixed liquid is kept at about 5° C.

Next, while the mixed liquid is cooled, 0.04 mole of a potassium permanganate powder is gradually added to the mixed liquid. Then, the reaction solution is stirred at room temperature for 4 hours, to which water is then gradually added, and the mixture is heated under reflux for 30 minutes. After the heated reaction solution is cooled to room temperature, an aqueous hydrogen peroxide solution is added dropwise to the reaction solution.

Subsequently, the obtained reaction mixture is centrifuged to recover a precipitate. The recovered precipitate is washed with dilute hydrochloric acid several times, and then centrifuged. Subsequently, the product obtained resulting from the centrifuge is dried by heating at 80° C. under vacuum.

An SEM image shown in FIG. 4 is one of the SEM images of the thus obtained, oxidized graphene structure.

[Preparation of Composite]

The titanium-niobium composite oxide powder, obtained according to the above procedure, and the oxidized graphene structure, obtained according to the above procedure, are added to water to prepare an aqueous dispersion. Whereupon, a mixing ratio of the graphene structure to the titanium-niobium composite oxide is adjusted to 3% by mass.

After the aqueous dispersion is stirred, water is evaporated from the aqueous dispersion to dry and solidify the aqueous dispersion. The thus obtained dry solid is heated at 800° C. over a span of one hour under an argon stream. Finally, the obtained solid is pulverized to obtain a composite.

In order to measure an angle of a graphene surface, a part of the obtained composite is dispersed in water by ultrasonication. After the ultrasonication, a portion of carbon that had floated up to the water surface is put on a grid for TEM measurement, and TEM images are measured. The slant of the graphene surface of the carbon material constituting the side surface is measured according to the method explained above. From the results thereof, it is found, as an average of 5 graphene structures, that the graphene surfaces of 80% of the carbon material constituting the side surface are slanted at an angle of 10° to 60° relative to the side surface.

[Preparation of Negative Electrode Active Material Sample]

100 g of the composite, obtained as described above, is weighed. Then, the weighed composite is added into 100 g of water, in which 3 g of lithium hydroxide had been dissolved. After that, the aqueous solution is left in a dryer at a 70° C. atmosphere while the aqueous solution is stirred, to evaporate water from the aqueous solution. The thus obtained solid is heated in the atmosphere at 400° C. over a span of 3 hours. Thus, a powder of a negative electrode active material sample A1 is obtained.

[Manufacturing of Test Electrode]

95% by mass of the powder of the negative electrode active material sample A1 and 5% by mass of polyvinylidene fluoride (PVdF) are added to N-methyl pyrrolidone (NMP) and mixed to prepare slurry. The resulting slurry is applied to both surfaces of a current collector formed of an aluminum foil having a thickness of 12 μm to obtain a coating of applied slurry, and the coating is dried. After that, the coating is pressed to obtain a test electrode.

[Preparation of Liquid Nonaqueous Electrolyte]

Ethylene carbonate (EC) and diethyl carbonate (DEC) are mixed in a volume ratio of 1:2 to obtain a mixed solvent. Lithium hexafluorophosphate $LiPF_6$, which is an electrolyte, is dissolved in the mixed solvent at a concentration of 1 M to prepare a liquid nonaqueous electrolyte.

[Manufacturing of Beaker Cell]

Using the test electrode, manufactured as described above, as a working electrode, and lithium metal as a counter electrode and a reference electrode, the liquid nonaqueous electrolyte prepared above is injected to manufacture a beaker cell of Example 1.

[Cycle Test]

First, the beaker cell of Example 1 is subjected to discharge at a constant current and a constant voltage of 1 C and 1 V for 3 hours under a temperature environment of 25° C. (lithium insertion). Next, the beaker cell of Example 1 is repeatedly subjected to 100 charge and discharge cycles, in which the beaker cell is charged at a constant current of 1 C until the voltage reaches 3 V (lithium release), and a capacity after the cycle is performed 100 times relative to an initial capacity is calculated as a capacity retention rate (%). The capacity retention rate is 80% or more.

[Shape Observation of Composite]

The composite is taken out from the beaker cell of Example 1 according to the method described above. The taken out composite is analyzed with SEM. As a result, it is found that the composite prepared in Example 1 has the structure shown schematically in FIG. 1.

Comparative Example 1

In Comparative Example 1, a composite is prepared in the same manner as in Example 1 except that, when preparing the composite, Ketjen black is used instead of the graphene structure, and a negative electrode active material sample is prepared using the resulting composite. A test electrode and a beaker cell of Comparative Example 1 are each manufactured in the same manner as in Example 1 using the negative electrode active material sample prepared in Comparative Example 1.

The beaker cell of Comparative Example 1 is subjected to the same cycle test as that subjected to the beaker cell of Example 1. The initial capacity of the breaker cell of Comparative Example 1 is comparable to that of the beaker cell of Example 1. The capacity retention rate of the beaker cell of Comparative Example 1, however, is about 50%, which is remarkably inferior to that in Example 1.

Example 2

In Example 2, a composite is prepared in the same manner as in Example 1 except that, when preparing the composite, 0.4% by mass of sucrose relative to the titanium-niobium composite oxide particles is further added to the aqueous dispersion in which the titanium-niobium composite oxide particles and the graphene structure had been added to, and a negative electrode active material sample is prepared using the resulting composite. A test electrode and a beaker cell of Example 2 are each manufacture in the same manner as in Example 1 using the negative electrode active material sample prepared in Example 2.

The beaker cell of Example 2 is subjected to the same cycle test as that subjected to the beaker cell of Example 1. The initial capacity of the beaker cell of Example 2 is comparable to that of the beaker cell of Example 1. The capacity retention rate of the beaker cell of Example 2 is 85% or more.

Example 3

In Example 3, first, a composite of Example 3 is prepared in the same manner as in Example 2 except for the method for synthesizing the active material particles.

In Example 3, the active material particles are synthesized specifically as follows:

First, a titanium dioxide ($TiO_2$) powder having an anatase structure, a niobium pentoxide ($Nb_2O_5$) powder, and a zirconium dioxide ($ZrO_2$) powder are prepared as starting materials. $TiO_2$, $Nb_2O_5$ and $ZrO_2$ are mixed in a mass ratio of 1:3.7:0.17 to obtain a mixture. The thus obtained mixture is sintered at 1100° C. for 24 hours. The sintered product is pulverized by a dry method using zirconia beads to control the particle size. Thus, a product powder is obtained.

Next, a portion of the product powder is analyzed according to the wide-angle X-ray diffraction method using the same conditions as in Example 1. As a result, it can be confirmed that the X-ray diffraction pattern of the product is the same as that of the monoclinic titanium-niobium composite oxide represented by the compositional formula $TiNb_2O_7$, attributed to JCPDS: #39-1407 (space group: C/2 m).

A portion of the obtained product is subjected to ICP-AES analysis. From the results thereof and the results of the X-ray analysis, it is found that the product is a monoclinic titanium-niobium composite oxide represented by a compositional formula $Ti_{0.9}Zr_{0.1}Nb_2O_7$.

100 g of the composite, which is prepared in Example 3 using the active material particles obtained above, is weighed. Then, the weighed composite is added into 100 g of water in which 3 g of lithium hydroxide is dissolved. After that, the aqueous solution is left in a dryer at a 70° C. atmosphere while the aqueous solution is stirred, to evaporate water from the aqueous solution. The thus obtained solid is heated in the atmosphere at 400° C. over a span of 3 hours. Thus, a powder of a negative electrode active material sample A2 is obtained.

Next, using the negative electrode active material sample A2, a test electrode and a beaker cell of Example 3 are each manufactured in the same manner as in Example 1.

The beaker cell of Example 3 is subjected to the same cycle test as that subjected to the beaker cell of Example 1. The capacity retention rate of the beaker cell of Example 3 is 90% or more.

Comparative Example 2

In Comparative Example 2, a composite is prepared in the same manner as in Example 3 except that, when preparing the composite, Ketjen black is used instead of the graphene structure, and a negative electrode active material sample is prepared using the resulting composite. A test electrode and a beaker cell of Comparative Example 2 are each manufactured in the same manner as in Example 1 using the negative electrode active material sample prepared in Comparative Example 2.

The beaker cell of Comparative Example 2 is subjected to the same cycle test as that subjected to the beaker cell of Example 1. The initial capacity of the beaker cell of Comparative Example 2 is comparable to that of the beaker cell of Example 2. The capacity retention rate of the beaker cell of Comparative Example 2, however, is about 60%, which is remarkably inferior to that in Example 2.

Example 4

In Example 4, first, a composite of Example 4 is prepared in the same manner as in Example 2 except for the method for synthesizing the active material particles.

In Example 4, the active material particles are specifically synthesized as follows:

First, a titanium dioxide ($TiO_2$) powder having an anatase structure and a niobium pentoxide ($Nb_2O_5$) powder are prepared as starting materials. $TiO_2$ and $Nb_2O_5$ are mixed in a mass ratio of 1:3.9 to obtain a mixture. The thus obtained mixture is sintered at 1100° C. for 24 hours. The sintered product is pulverized by a dry method using zirconia beads to control the particle size. Thus, a product powder is obtained.

Next, a portion of the product powder is analyzed according to the wide-angle X-ray diffraction method using the same conditions as in Example 1. As a result, it can be confirmed that the X-ray diffraction pattern of the product is the same as that of the monoclinic titanium-niobium composite oxide represented by the compositional formula $TiNb_2O_7$, attributed to JCPDS: #39-1407 (space group: C/2 m).

A portion of the obtained product is subjected to ICP-AES analysis. From the results thereof and the results of the X-ray analysis, it is found that the product is a monoclinic titanium-niobium composite oxide represented by a compositional formula $Ti_{0.9}Nb_{2.1}O_{7.05}$.

100 g of the composite, which is prepared in Example 4 using the active material particles obtained above, is weighed. Then, the weighed composite is added to 100 g of water in which 3 g of lithium hydroxide is dissolved. After that, the aqueous solution is left in a dryer at a 70° C. atmosphere while the aqueous solution is stirred, to evaporate water from the aqueous solution. The thus obtained solid is heated in the atmosphere at 400° C. over a span of 3 hours. Thus, a powder of a negative electrode active material sample A3 is obtained.

Next, using the negative electrode active material sample A3, a test electrode and a beaker cell of Example 4 are each manufactured in the same manner as in Example 1.

The beaker cell of Example 4 is subjected to the same cycle test as that subjected to the beaker cell of Example 1. The capacity retention rate of the beaker cell of Example 4 is 85% or more.

Example 5

In Example 5, a composite of Example 5 is prepared in the same manner as in Example 2 except that maltose is used instead of the sucrose, and a negative electrode active material sample is prepared using the resulting composite. A test electrode and a beaker cell of Example 5 are each manufactured in the same manner as in Example 2 using the negative electrode active material sample prepared in Example 5.

The beaker cell of Example 5 is subjected to the same cycle test as that subjected to the beaker cell of Example 1. The capacity retention rate of the beaker cell of Example 5 is 90% or more.

Example 6

In Example 6, a composite of Example 6 is prepared in the same manner as in Example 2 except that oxidized graphene fragments having a diameter of 200 nm are used instead of the sucrose, and a negative electrode active material sample is prepared using the resulting composite. A test electrode and a beaker cell of Example 6 are each manufactured in the same manner as in Example 2 using the negative electrode active material sample prepared in Example 6.

The beaker cell of Example 6 is subjected to the same cycle test as that subjected to the beaker cell of Example 1. The capacity retention rate of the beaker cell of Example 6 is 90% or more.

Example 7

In Example 7, a test electrode of Example 7 is manufactured by the following procedures.

[Synthesis of Titanium-Niobium Composite Oxide as Active Material Particle]

In Example 7, a monoclinic titanium-niobium composite oxide powder represented by a compositional formula $TiNb_2O_7$ is prepared in the same manner as in Example 1.

[Preparation of Graphene Structure]

In Example 7, a graphene structure formed by densely laminating the oxidized graphene is prepared in the same manner as in Example 1.

Subsequently, the obtained graphene structure is dispersed in water, to which hydrazine hydrate is added, and the mixture is reacted at 90° C.

Subsequently, the reaction product is suction-filtered, and the obtained residue is heated at 800° C. under an argon stream.

The obtained product is analyzed by XPS. As a result, it is found that the product is a nitrogen-doped graphene structure including carbon as a main component, and including 4% of nitrogen atoms, 3% of oxygen atoms, and 0.05% of manganese atoms, relative to the carbon atoms.

The obtained product is observed with SEM. FIG. 5 is one of the SEM images obtained by observing the graphene structure prepared as above. As shown in FIG. 5, the graphene structure 11 of Example 7 has a column structure. A part of the graphene structure 11 of Example 7 has a cavity at an end 11d of the column structure.

FIGS. 6 to 10 show examples of the TEM image of the graphene structure of Example 7. From the TEM images, it is found that the graphene structure of Example 7 includes column structures and coiled column structures represented by reference number 71. From FIGS. 8 to 10, it is also found that the side surface of the graphene structure of Example 7 includes a carbon material whose graphene surface is slanted relative to the side surface.

Using the method explained above, in the graphene structure of Example 7, it is found, as an average value of 5 graphene structures, that the graphene surfaces of 90% of the carbon material constituting the side surface of the graphene structure are slanted relative to the side surface in an angle of 5° to 80°. It is also found that the graphene surfaces of 85% of the carbon material constituting the side surface of the graphene structure are slanted relative to the side surfaces in an angle of 10° to 60°.

[Preparation of Composite]

The titanium-niobium composite oxide powder, obtained according to the above procedure, the graphene structure, obtained according to the above procedure, and sucrose are added to water to prepare an aqueous dispersion. Whereupon, the graphene structure and the sucrose are added at a mixing ratio of 2% by mass and 0.4% by mass to the titanium-niobium composite oxide powder, respectively.

After the aqueous dispersion is stirred, water is evaporated from the aqueous dispersion to dry and solidify the aqueous dispersion. The thus obtained dry solid is heated at 800° C. over a span of one hour under an argon stream. Finally, the obtained solid is pulverized to obtain a composite.

The obtained product is analyzed by XPS. As a result, it is found that the product includes 2.5 atom % of nitrogen atoms relative to the carbon atoms. In addition, from the XPS analysis results, it is found that the composite includes carbon atoms attributed to C—O bond at a percentage of 1.5% of the total carbon atoms.

[Preparation of Negative Electrode Active Material Sample]

Using the composite obtained as above, a powder of a negative electrode active material sample is prepared in the same manner as in Example 1.

[Manufacturing of Test Electrode and Beaker Cell]

Using the thus obtained powder of negative electrode active material sample of Example 7, a test electrode and a beaker cell are each manufactured in the same manner as in Example 1.

[Test]

The beaker cell of Example 7 is subjected to the same cycle test as that subjected to the beaker cell of Example 1. The capacity retention rate of the beaker cell of Example 7 is 95% or more.

Example 8

In Example 8, a test electrode is prepared by the following procedures.

First, as the active material, a spinel lithium titanate ($Li_4Ti_5O_{12}$) powder having an average particle size of primary particles of 0.3 μm, a BET specific surface area of 15 m²/g, and a Li absorption voltage of 1.55 V (vs. Li/Li⁺) is prepared as the active material particle.

The active material particles, the graphene structure prepared in Example 7, and polyvinylidene fluoride (PVdF) as a binder, are dispersed in an n-methyl pyrrolidone (NMP) solvent at a mass ratio of 90:6:3. The thus obtained dispersion is stirred at 1000 rpm for a stirring time of 2 hours using a ball mill to prepare a slurry. The obtained slurry is applied on both surfaces of an aluminum foil (a purity of 99.99%) having a thickness of 10 μm and an average crystal particle size of 10 μm to obtain coatings of applied slurry, and the coatings of applied slurry are dried. Next, the dried coatings of applied slurry are subjected to a heat-pressing step, thereby obtaining a test electrode of Example 8 including a composite having the same structure as that shown schematically in FIG. 1.

Using the test electrode of Example 8, a beaker cell of Example 8 is manufactured in the same manner as in Example 1.

The beaker cell of Example 8 is subjected to the same cycle test as that subjected to the beaker cell of Example 1. The capacity retention rate of the beaker cell of Example 8 is 85% or more.

Comparative Example 3

In Comparative Example 3, a test electrode and a beaker cell of Comparative Example 3 are produced in the same manner as in Example 8 except that Ketjen black is used instead of the graphene structure of Example 7.

The beaker cell of Comparative Example 3 is subjected to the same cycle test as that subjected to the beaker cell of Example 1. The initial capacity in Comparative Example 3 is comparable to that of the beaker cell of Example 8. The capacity retention rate of the beaker cell of Comparative Example 3, however, is about 75%.

Example 9

In Example 9, a test electrode is prepared by the following procedures.

Synthesis of Monoclinic β Type Titanium Dioxide Powder as Active Material]

First, a niobium oxide ($Nb_2O_5$) powder, a potassium carbonate ($K_2CO_3$) powder, and an anatase type titanium dioxide ($TiO_2$) powder are prepared as starting materials. Subsequently, $Nb_2O_5$, $K_2CO_3$, and $TiO_2$ (anatase) are mixed at a mass ratio of 0.002:0.43:1.0 to obtain a mixture. The thus obtained mixture is sintered at 1100° C. for 24 hours. After the sintering, the product is pulverized to obtain a product powder.

The product powder is analyzed using ICP-AES. As a result, it is found that the product is a compound having a composition $K_2Ti_4O_9$, which includes 0.11% by weight of Nb.

Subsequently, the $K_2Ti_4O_9$ powder is pulverized by a dry method using zirconium beads to control the particle size, and then washed with pure water, to yield a proton exchanger precursor. The proton exchanger precursor is added to a 1 M aqueous hydrochloric acid solution, which is stirred under a temperature environment of 25° C. for 12 hours to obtain a proton exchanger. The proton exchanger is sintered in the atmosphere at 350° C. for 3 hours to obtain a product powder.

The thus produced product powder is subjected to an analysis according to the wide-angle X-ray diffraction method. As a result, it can be confirmed that the X-ray diffraction pattern of the product is the same as that of monoclinic β-type titanium dioxide, attributed to JCPDS: 46-1237.

[Manufacturing of Test Electrode and Beaker Cell]

A test electrode and a beaker cell of Example 9 is manufactured in the same manner as in Example 8, except that the thus obtained monoclinic β-type titanium dioxide $TiO_2(B)$ is used as the active material particle.

[Test]

The beaker cell of Example 9 is subjected to the same cycle test as that subjected to the beaker cell of Example 1. The capacity retention rate of the beaker cell of Example 9 is 80% or more.

Comparative Example 4

In Comparative Example 4, a test electrode and a beaker cell of Comparative Example 4 are manufactured in the same manner as in Example 9 except that Ketjen black is used instead of the graphene structure of Example 7.

The beaker cell of Comparative Example 4 is subjected to the same cycle test as that subjected to the beaker cell of Example 1. The initial capacity in Comparative Example 4 is comparable to that of the beaker cell of Example 9. The capacity retention rate of the beaker cell of Comparative Example 4, however, is about 75%.

[Results]

The results of the capacity retention rates with respect to the beaker cell of each of Examples 1 to 9 and Comparative Examples 1 to 4 are summarized in Table 1 described below.

TABLE 1

| | Composition of Active Material | Whether Graphene Structure Exists | Material of Additional Carbon Layer | Capacity Retention Rate |
|---|---|---|---|---|
| Example 1 | $TiNb_2O_7$ | yes | none | 80% or more |
| Example 2 | $TiNb_2O_7$ | yes | sucrose | 85% or more |
| Example 3 | $Ti_{0.9}Zr_{0.1}Nb_2O_7$ | yes | none | 90% or more |
| Example 4 | $Ti_{0.9}Nb_{2.1}O_{7.05}$ | yes | none | 85% or more |

TABLE 1-continued

| | Composition of Active Material | Whether Graphene Structure Exists | Material of Additional Carbon Layer | Capacity Retention Rate |
|---|---|---|---|---|
| Example 5 | TiNb$_2$O$_7$ | yes | maltose | 90% or more |
| Example 6 | TiNb$_2$O$_7$ | yes | graphene fragment | 90% or more |
| Example 7 | TiNb$_2$O$_7$ | yes (Nitrogen Doped) | sucrose | 95% or more |
| Example 8 | Li$_4$Ti$_5$O$_{12}$ | yes (Nitrogen Doped) | none | 85% or more |
| Example 9 | TiO$_2$ (B) (includes Nb) | yes (Nitrogen Doped) | none | 80% or more |
| Comparative Example 1 | TiNb$_2$O$_7$ | no | none | about 50% |
| Comparative Example 2 | Ti$_{0.9}$Zr$_{0.1}$Nb$_2$O$_7$ | no | none | about 60% |
| Comparative Example 3 | Li$_4$Ti$_5$O$_{12}$ | no | none | about 75% |
| Comparative Example 4 | TiO$_2$ (B) (includes Nb) | no | none | about 75% |

From Table 1, it is found the beaker cells of Example 1 to Example 9 can exhibit capacity retention rate that is more excellent than those of the beaker cell of Comparative Examples 1 to 4. This can be considered to be because in the beaker cells of Example 1 to Example 9, the active material particles of the titanium composite oxide or oxide of titanium are strongly bonded to the graphene structure, and as a result, the graphene structure shows excellent stability.

On the other hand, it can be considered that in the beaker cells of Comparative Examples 1 to 4, since Ketjen black is used instead of the graphene structure, and thus the test electrodes of Comparative Examples 1 to 4 cannot have sufficient conductivity, thereby resulting in the low capacity retention.

Among the beaker cells of Examples 1 to 7 which all have the same active material particles of the titanium-niobium composite oxide, the beaker cell of Example 7 which uses the composite including nitrogen-doped graphene structure can exhibit the highest capacity retention rate. This can be considered to be because the graphene structure in Example 7 has cavities at the end, as shown in FIG. 5, and thus has many active sites. As a result, the bonding to the particles of the titanium-niobium composite oxide can be further strengthened.

Comparing the results in Examples 3, 4, and 7 to 9, it is found that, in these Examples, though the composition of the active material particle are different from each other, by having the active material particles of the titanium composite oxide or oxide of titanium used in combination with the graphene structure, excellent capacity retention is similarly exhibited.

According to at least one of embodiments and examples, as explained above, a composite including active material particles of titanium composite oxide or oxide of titanium, and a graphene structure is provided. In the composite, excellent bonding can be exhibited between the active material particles and the graphene structure. In addition, the graphene structure can exhibit excellent stability. As a result, the composite according to an embodiment allows a non-aqueous electrolyte battery capable of showing excellent capacity retention to be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a negative electrode;
a positive electrode; and
a nonaqueous electrolyte,
wherein the negative electrode comprises:
a negative electrode current collector; and
a negative electrode layer formed on the negative electrode current collector, wherein the negative electrode layer comprises a nonaqueous electrolyte battery active material and a binder, wherein the nonaqueous electrolyte battery active material and the binder are comprised in the negative electrode layer in a dispersed state, and wherein the nonaqueous electrolyte battery active material comprises a composite comprising:
active material particles of a titanium composite oxide or an oxide of titanium; and
a graphene structure comprising a plurality of carbon materials each having a graphene framework defining a graphene surface, wherein the graphene structure has a form of a column or fiber, wherein the column and fiber precludes a tube, wherein the carbon materials are stacked such that 50% or more of the graphene surface is overlapped with another graphene surface, wherein the graphene structure is in a state of being dispersed among the active material particles and having at least one side surface of the column or fiber in contact with the active material particles, and wherein the carbon materials comprise exterior carbon materials constituting at least one side surface of the column or fiber and interior carbon materials separate from the exterior carbon materials, wherein the graphene surface of each of the exterior carbon materials is slanted relative to the at least one side surface of the column or fiber, and the interior carbon materials do not constitute any side surface of the column or fiber.

2. The nonaqueous electrolyte battery according to claim 1, wherein the graphene surface is slanted relative to the at least one side surface at an angle of from 5° to 80°.

3. The nonaqueous electrolyte battery according to claim 1, wherein the active material particles comprise the titanium composite oxide.

4. The nonaqueous electrolyte battery according to claim 3, wherein the titanium composite oxide is represented by the following formula:

wherein indexes x, y and z are respectively within a range of 0≤x≤5, 0≤y<1, and 0≤z≤2, M1 is at least one element selected from a group consisting of Zr, Si, and Sn, and M2 is at least one element selected from a group consisting of V, Nb, Ta, and Bi.

5. The nonaqueous electrolyte battery according to claim 3, wherein the titanium composite oxide is represented by the following formula:

$$Li_{4+x}Ti_5O_{12},$$

wherein x is within a range of 0≤x≤3.

6. The nonaqueous electrolyte battery according to claim 1, wherein the active material particle further comprises a carbon layer on its surface.

7. The nonaqueous electrolyte battery according to claim 6, wherein the carbon layer comprises a graphene fragment having a diameter of 200 nm or less.

8. The nonaqueous electrolyte battery according to claim 1, wherein the carbon material further comprises at least one element selected from a group consisting of nitrogen, oxygen, and phosphorus.

9. The nonaqueous electrolyte battery according to claim 1, comprising a lithium ion, a sodium ion, or a magnesium ion as a charge carrier.

10. The nonaqueous electrolyte battery according to claim 1, wherein the negative electrode layer further comprises a conductive agent.

11. The nonaqueous electrolyte battery of claim 1, wherein the graphene structure has a cavity at an end portion.

12. The nonaqueous electrolyte battery of claim 1, wherein the graphene structure has the form of a column.

* * * * *